United States Patent [19]

Kashio

[11] Patent Number: 5,526,518
[45] Date of Patent: Jun. 11, 1996

[54] DATA PROCESSING APPARATUS

[75] Inventor: Toshio Kashio, Tokyo, Japan

[73] Assignee: Casio Computer Co., Ltd., Tokyo, Japan

[21] Appl. No.: 104,352

[22] Filed: Aug. 9, 1993

Related U.S. Application Data

[63] Continuation of Ser. No. 360,241, Jun. 1, 1989, abandoned.

[30] Foreign Application Priority Data

Jul. 14, 1988 [JP] Japan ................... 63-175401
Jul. 14, 1988 [JP] Japan ................... 63-175410
Jul. 14, 1988 [JP] Japan ................... 63-175430

[51] Int. Cl.⁶ .................................. G06F 17/30
[52] U.S. Cl. ................... 395/600; 364/DIG. 2; 364/918; 364/918.1; 364/918.4; 364/962; 364/962.1; 364/963
[58] Field of Search ................ 364/149, 155, 364/401, 406, 156, DIG. 1, DIG. 2

[56] References Cited

U.S. PATENT DOCUMENTS

| | | |
|---|---|---|
| 3,822,378 | 7/1974 | Kashio . |
| 4,003,031 | 1/1977 | Kashio . |
| 4,031,515 | 6/1977 | Kashio . |
| 4,032,900 | 6/1977 | Kashio . |
| 4,034,350 | 7/1977 | Kashio . |
| 4,064,553 | 12/1977 | Kashio . |
| 4,079,234 | 3/1978 | Kashio . |
| 4,103,334 | 7/1978 | Kashio . |
| 4,133,041 | 1/1979 | Kashio . |
| 4,145,753 | 3/1979 | Kashio . |
| 4,321,672 | 3/1982 | Braun et al. . |
| 4,360,872 | 11/1982 | Suzuki . |
| 4,370,707 | 1/1983 | Phillips . |
| 4,555,759 | 11/1985 | McCaskill . |
| 4,633,397 | 12/1986 | Macco . |
| 4,642,767 | 2/1987 | Lerner . |
| 4,667,292 | 5/1987 | Mohlenbrock et al. . |
| 4,730,252 | 3/1988 | Bradshaw . |
| 4,809,170 | 2/1989 | LeBlang et al. . |
| 4,851,999 | 7/1989 | Mariyama ................... 364/401 |
| 4,852,000 | 7/1989 | Webb et al. . |

(List continued on next page.)

FOREIGN PATENT DOCUMENTS

| | | |
|---|---|---|
| 0213276 | 3/1987 | European Pat. Off. . |
| 0216535 | 4/1987 | European Pat. Off. . |
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |
| WO84/02022 | 5/1984 | WIPO . |

OTHER PUBLICATIONS

"Quattro® Pro", Version 4.C, User's Guide, Chapter 11, Spreadsheet Links, pp. 299–308.
IBM Technical Disclosure Bulletin, vol. 31, No. 1, Jun. 1988, pp. 158–159.
"Exploring Technology: Today and Tomorrow" Proceedings, 1987 Fall Joint Computer Conference, Oct. 25–29, 1987, pp. 453–460.
Encyclopedia of Computer Science, "Access Time" pp. 2–6; Database Management pp. 441–447, Copyright 1983, ISBN: 9-422-24496-7, No. 82,2700.

*Primary Examiner*—Kevin A. Kriess
*Assistant Examiner*—Kakali Chaki
*Attorney, Agent, or Firm*—Frishauf, Holtz, Goodman & Woodward

[57] ABSTRACT

All data are uniformly and automatically processed in a data processing system. An input record is transformed into a record having a uniform format. All file formats are unified. A desired record is read out from a file and transformed into an arbitrary format. Data input processing, a file update processing, and data output processing are designed to process data independently, uniformly, and automatically. A process content to be performed by each of the data input, file update, and data output processings is designated by a simple data item such as a record keyword and a data word.

24 Claims, 27 Drawing Sheets

U.S. PATENT DOCUMENTS

| | | |
|---|---|---|
| 4,910,676 | 3/1990 | Alldredge . |
| 4,914,569 | 4/1990 | Levine et al. . |
| 4,918,593 | 4/1990 | Huber . |
| 4,939,689 | 7/1990 | Davis et al. . |
| 4,949,258 | 8/1990 | Miyamoto . |
| 4,967,348 | 10/1990 | Naito et al. . |
| 5,043,871 | 8/1991 | Nishigaki et al. ............... 364/200 |
| 5,072,367 | 12/1991 | Clayton et al. ................. 395/600 |
| 5,079,408 | 3/1992 | Huber . |
| 5,079,695 | 1/1992 | Dysart . |
| 5,115,490 | 5/1992 | Komuro et al. ................. 395/400 |
| 5,131,090 | 7/1992 | Fukushima . |

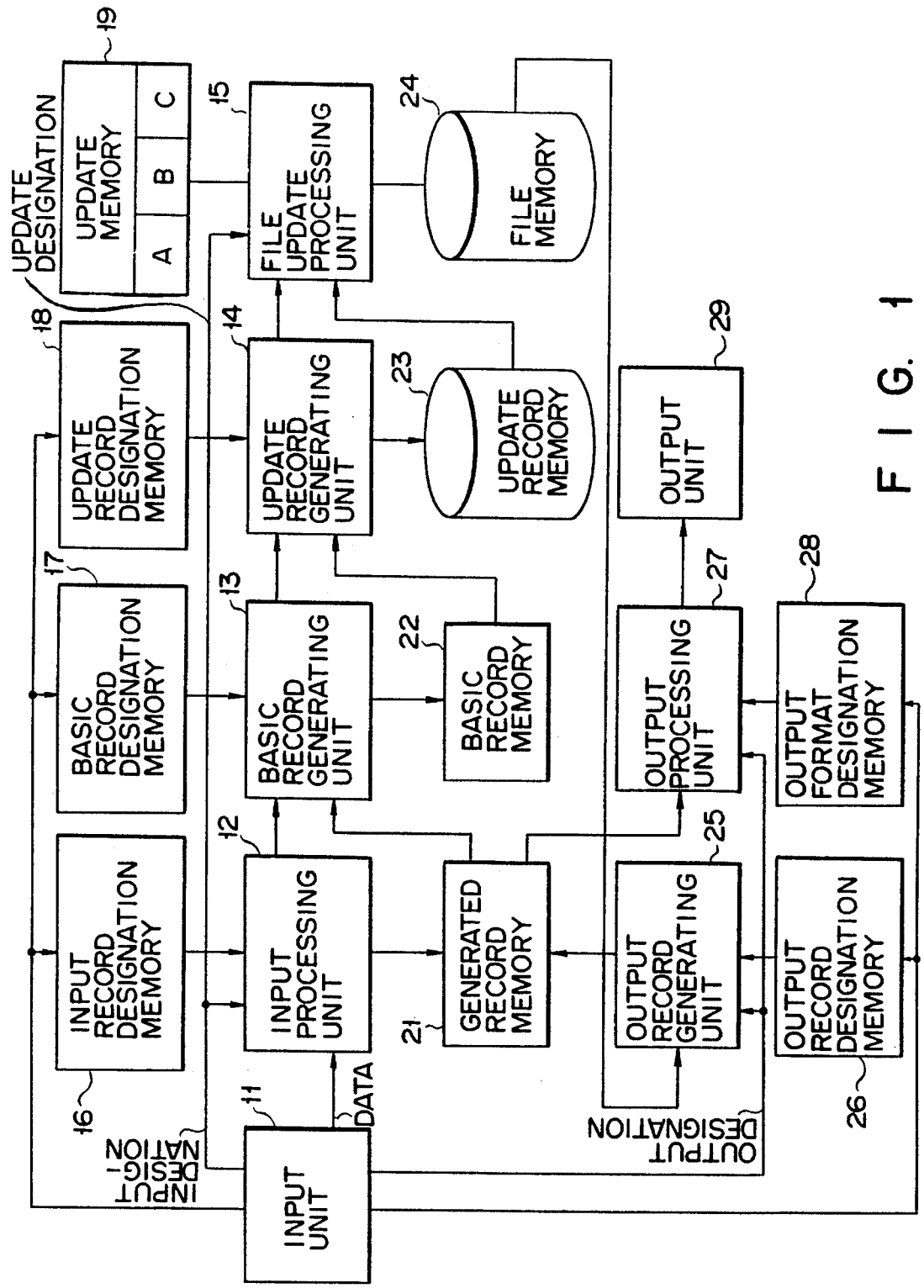
F I G. 1

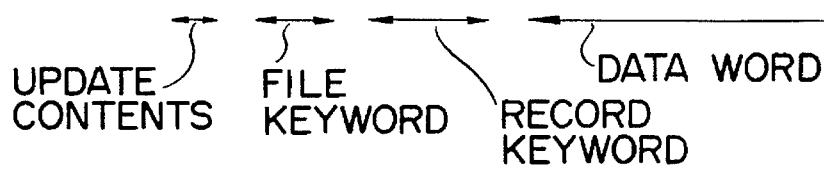
F I G. 5A
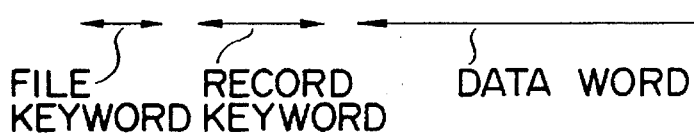
F I G. 5B

§F1(m,m,m;m,m,m,········.
   (m,m,m;m.,m,m,····,
   ⋮

§F2(m,m;m,,m,m,·········.
   (m,m;m,m,m,m,········,
   ⋮

FILE   RECORD   DATA WORD
KEYWORD KEYWORD

FILE   RECORD   DATA WORD
KEYWORD KEYWORD

FIG. 6B

FIG. 10 — OUTPUT RECORD DESIGNATION MEMORY (26)

| | .1 | .2 | .3 | l1 | l1 | l1 | l1 | l2 | l3 | l3 | l4 | C1 | C1 | l5 |
|---|---|---|---|---|---|---|---|---|---|---|---|---|---|---|
| | ao1>1 | ao1>2 | ao1<3 | b1/T | b.1 & b.2/T | ao1/T | | a12 | a13 | b12×b13 | | b14 | b12/C1 |
| GENERATING RENIT 3 | / | / | / | 0 | 0 | 1 | | 1 | 1 | 1 | | 0 | 1 |
| GENERATING RENIT 2 | / | / | / | 0 | 1 | 0 | | 0 | 1 | 1 | | 1 | 0 |
| GENERATING RENIT 1 | / | / | / | 1 | 0 | 0 | | 0 | 1 | 1 | | 0 | 0 |

GENERATING WORD ·······
WORD CONTENTS ·······

FIG. 13 — GENERATED RECORD MEMORY (21)

```
    .1  .2  .3    l1           l2      l3      l4       l5
 ( 1,  ,   ,  TIMEPIECE ,      ,        ,  150,  360000,      ,
 ( 1,  1,  ,  WATCH     ,      ,        ,  105,  275000,      ,
 ( 1,  1,  1, WATCH A   , 1000,  50,  500000,    0.18,
 ( 1,  1,  2, WATCH B   , 3000,  25,   75000,    0.27,
 ( 1,  1,  3, WATCH C   , 5000,  30,  150000,    0.58,
 ( 1,  2,  ,  CLOCK     ,      ,        ,   45,   85000,      ,
 ( 1,  2,  1, CLOCK A   , 1000,  20,   20000,    0.24,
                     ········
```

```
 01  02    12      13
(I, 1,        , 150, ········ ,
(II, 1,       , 105, ········ ,
(III, 1, 1000,  50, ········ ,
(III, 2, 3000,  25, ········ ,
(III, 3, 5000,  30, ········ ,
(II, 2,       ,  45, ········ ,
(III, 1, 1000,  20, ········ ,
        ⋮
```

| RENIT | START POINT | | LENGTH | | LINE TYPE | WORD NO | WORD TYPE |
|---|---|---|---|---|---|---|---|
| | X COOR-DINATE | Y COOR-DINATE | HORI-ZONTAL | VERT-ICAL | | | |
| S | | Y2 | | | | | |
| M | X4 | Y1 | $ℓ_4$ | m | 3030 | 1 | |
| | X5 | Y1 | $ℓ_5$ | m | 3033 | 2 | |
| 1 | X1 | Yn | $ℓ_1$ | m | 1010 | 11 | |
| | X4 | Yn | $ℓ_4$ | m | 1030 | 14 | |
| | X5 | Yn | $ℓ_5$ | m | 1031 | 13 | |
| 2 | X1 | Yn | 0 | m | 0010 | | |
| | X2 | Yn | $ℓ_2$ | m | 2020 | 11 | |
| | X4 | Yn | $ℓ_4$ | m | 2030 | 14 | |
| | X5 | Yn | $ℓ_5$ | m | 2031 | 13 | |
| 3 | X1 | Yn | $ℓ_6$ | m | 0012 | | |
| | X3 | Yn | $ℓ_3$ | m | 3030 | 11 | |
| | X4 | Yn | $ℓ_4$ | m | 3030 | 14 | |
| | X5 | Yn | $ℓ_5$ | m | 3031 | 13 | |
| R | X1 | Yn | $ℓ_7$ | m | 1000 | | |

F I G. 15

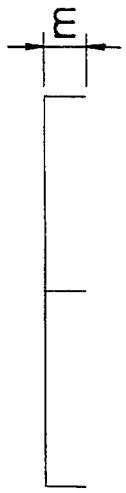
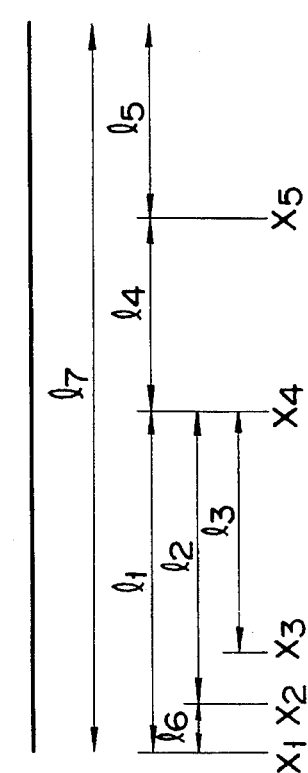
FIG. 16A
FIG. 16B
FIG. 16C
FIG. 16D
FIG. 16E

| RENIT | START POINT | | LENGTH | | LINE TYPE | WORD NO. | WORD TYPE |
|---|---|---|---|---|---|---|---|
| | X COOR-DINATE | Y COOR-DINATE | HORI-ZONTAL | VERT-ICAL | | | |
| $R_1$ | $X_1$ | $Y_n$ | $\ell_7$ | m | 1000 | | |
| $R_2$ | $X_2$ | $Y_n$ | $\ell_8$ | m | 2000 | | |
| $R_3$ | $X_3$ | $Y_n$ | $\ell_9$ | m | 3000 | | |

$\ell_8 = \ell_2 + \ell_4 + \ell_5, \quad \ell_9 = \ell_3 + \ell_4 + \ell_5$

|  | AMOUNT | QUANTITY |
|---|---|---|
| TIMEPIECE | 360,000 | 150 |
| WATCH | 275,000 | 105 |
| WATCH A | 50,000 | 50 |
| WATCH B | 75,000 | 25 |
| WATCH C | 150,000 | 30 |
| CLOCK | 85,000 | 45 |
| CLOCK A | 20,000 | 20 |
| CLOCK B | 20,000 | 10 |
| CLOCK C | 45,000 | 15 |
| CALCULATOR | 300,000 | 250 |
| FILM CARD | 90,000 | 40 |
| FILM CARD A | 15,000 | 10 |
| FILM CARD B | 30,000 | 15 |
| FILM CARD C | 45,000 | 15 |

$\ell_7$
$\ell_8$
$\ell_9$

F I G. 22

|  | AMOUNT | QUANTITY |
|---|---|---|
| FUNCTION CALC. | 290,000 | 100 |
| FUNC. CALC. A | 130,000 | 65 |
| FUNC. CALC. B | 10,000 | 5 |
| FUNC. CALC. C | 150,000 | 30 |
| COMPLEXED CALC. | 5,000 | 45 |
| COMP. CALC. A | 2,000 | 0 |
| COMP. CALC. B |  |  |

F I G. 23

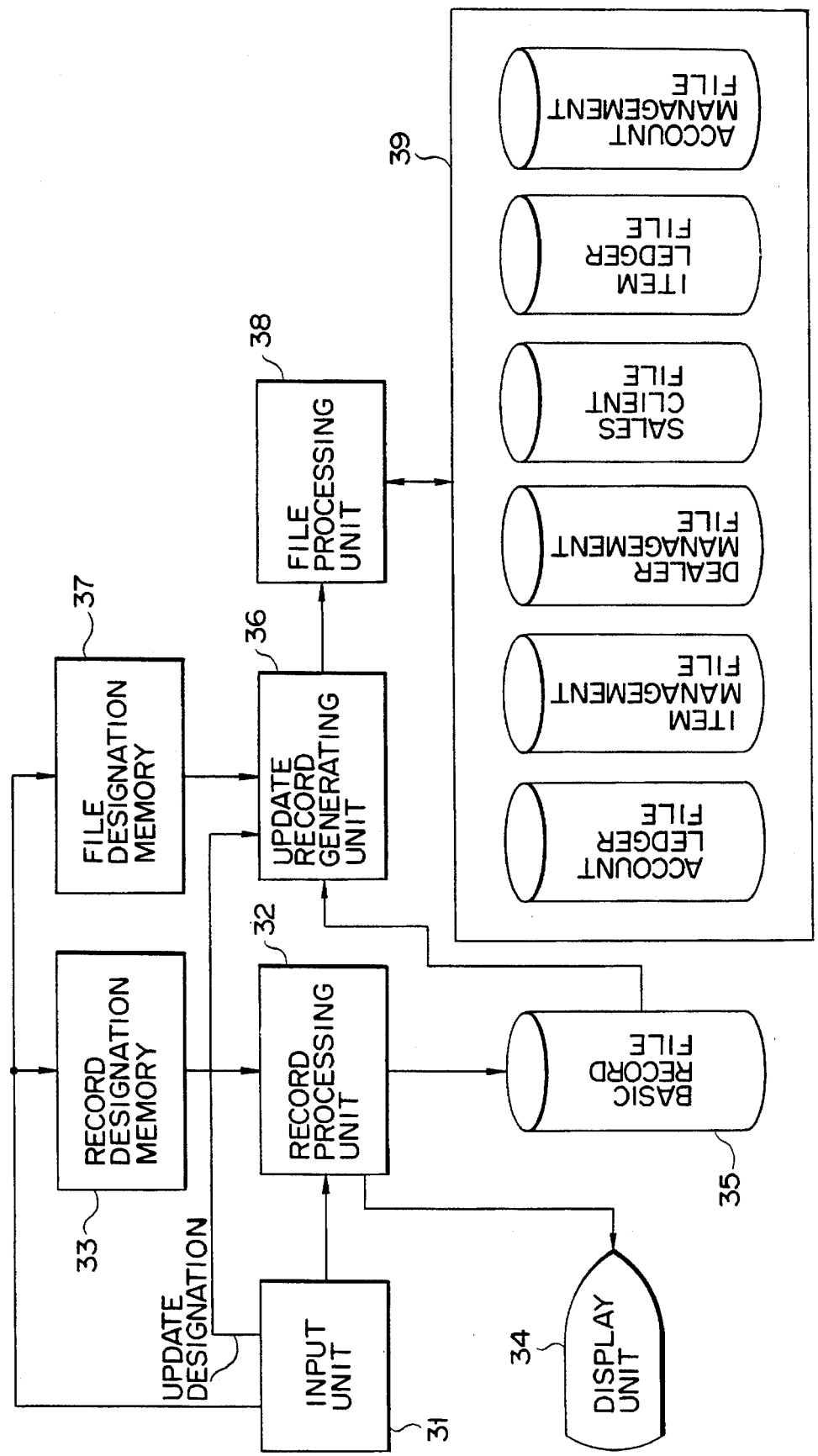
F I G. 24

| BASIC WORD | INPUT WORD |
|---|---|
| 1 YEAR/MONTH/DATE | |
| 2 SLIP NO. | |
| 3 AMOUNT | |
| 4 DEBTOR'S ACCOUNT | |
| 5 DEBTOR'S CLIENT | |
| 6 DEBTOR'S DETAIL | |
| 7 CREDITOR'S ACCOUNT | |
| 8 CREDITOR'S CLIENT | |
| 9 CREDITOR'S DETAIL | |
| 10 PERSON IN CHARGE | |
| 11 ITEM | |
| 12 QUANTITY | |
| 13 UNIT PRICE | |

F I G. 25

37

| FILE NAME | |
|---|---|
| UPDATE CONTENTS | |

| FILE WORD | BASIC WORD |
|---|---|
| | |
| | |
| | |
| | |
| | |
| | |

| FILE NAME | TOTAL ACCOUNT |
|---|---|
| UPDATE CONTENTS | BASIC WORD |
| FILE WORD | BASIC WORD |
| OUR ACCOUNT | DEBTOR ACCOUNT |
| YEAR MONTH | YEAR MONTH |
| DEBIT BALANCE | AMOUNT |
| CREDIT BALANCE | |
| | |
| | |

F I G. 27B

| FILE NAME | TOTAL ACCOUNT |
|---|---|
| UPDATE CONTENTS | ADDITION |
| FILE WORD | BASIC WORD |
| OUR ACCOUNT | DEBTOR ACCOUNT |
| DATE | YEAR / MONTH / DATE |
| CLIENT'S ACCOUNT | CREDITOR ACCOUNT |
| DEBIT BALANCE | AMOUNT |
| CREDIT BALANCE | |
| OUR ACCOUNT DETAIL | DEBIT ACCOUNT DETAIL |

F I G. 27C

| FILE NAME | ITEM MANAGEMENT |
|---|---|
| UPDATE CONTENTS | TOTAL |
| FILE WORD | BASIC WORD |
| ITEM | ITEM |
| YEAR/MONTH | YEAR/MONTH |
| DEBIT BALANCE | AMOUNT |
| CREDIT BALANCE | |
| NUMBER OF SUPPLEMENT | QUANTITY |
| NUMBER OF SHIPMENT | |

F I G. 27D

| FILE NAME | DEALER MANAGEMENT |
|---|---|
| UPDATE CONTENTS | TOTAL |
| FILE WORD | BASIC WORD |
| PERSON IN CHARGE | PERSON IN CHARGE |
| ITEM | ITEM |
| DEBIT BALANCE | AMOUNT |
| CREDIT BALANCE | |
| NUMBER OF SUPPLEMENT | QUANTITY |
| NUMBER OF SHIPMENT | |

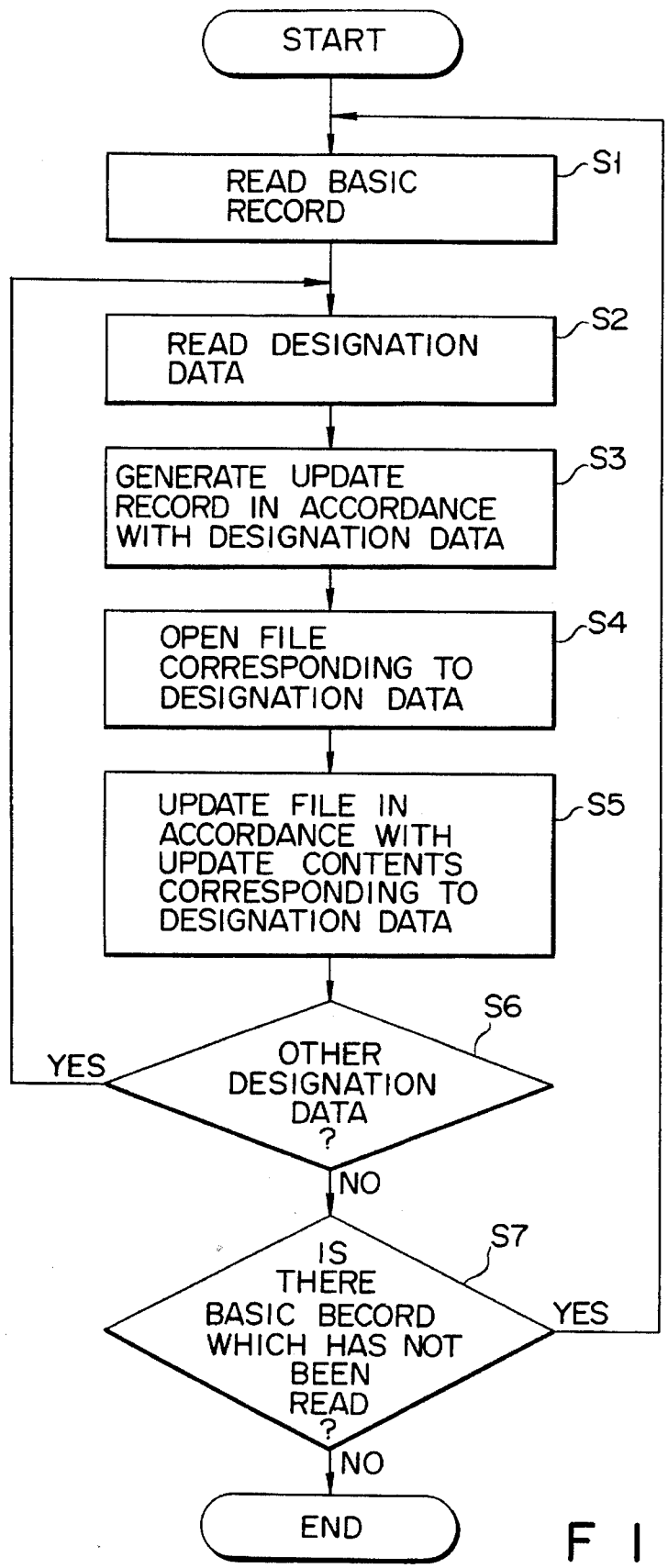
F I G. 28

| FILE NAME | | ACCOUNT LEDGER | ITEM MANAGEMENT | DEALER MANAGEMENT | SALES CLIENT |
|---|---|---|---|---|---|
| UPDATE CONTENTS | | ADDITION | TOTAL | TOTAL | TOTAL |
| YEAR/MONTH/DATE | 1 | RK2 ② | | | |
| SLIP NO | 2 | | | | |
| AMOUNT | 3 | DEBIT BALANCE | SALES AMOUNT | SALES AMOUNT | SALES AMOUNT |
| DEBTOR ACCOUNT | 4 | RK1 ① | | | |
| DEBTOR ACCOUNT DIVISION | 5 | OUR ACCOUNT DIVISION | | | |
| DEBTOR'S CLIENT | 6 | RK1 ② | | | RK1 |
| DEBTOR'S OBJECT DIVISION | 7 | | | | |
| DEBTOR'S PERSON IN CHARGE | 8 | | | | |
| CREDITOR ACCOUNT | 9 | RK2, CLIENT'S ACCOUNT ① | | | |
| CREDITOR ACCOUNT DIVISION | 10 | CLIENT'S ACCOUNT DIVISION | | | |
| CREDITOR'S CLIENT | 11 | | | | |

FIG. 29A

| | | | | | |
|---|---|---|---|---|---|
| CREDITOR'S OBJECT DIVISION | 12 | CLIENT'S ACCOUNT OBJECT DIVISION | | | |
| CREDITOR'S PERSON IN CHARGE | 13 | CLIENT'S ACCOUNT PERSON IN CHARGE | | | |
| TRANSACTION DETAIL | 14 | TRANSACTION DETAIL | | | |
| USER SLIP NO. | 15 | USER SLIP NO. | | | |
| TOTAL DIVISION | 16 | | | | |
| FISCAL YEAR | 17 | | RK 2 | RK 2 ② | RX 2 ② |
| ARRANGEMENT NO. | 18 | | | | |
| CLIENT ARRANGEMENT NO. | 19 | CLIENT ARRANGEMENT NO. | | | |
| ITEM CODE | 20 | ITEM CODE | RK 1 | RK 2 ① | RK 2 ① |
| PERSON IN CHARGE CODE | 21 | PERSON IN CHARGE CODE | | RK 1 | |
| TRANSACTION DIVISION NO | 22 | TRANSACTION DIVISION NO. | | | |
| QUANTITY OF SUPPLEMENT | 23 | QUANTITY OF SUPPLEMENT | | | |
| UNIT OF SUPPLEMENT | 24 | UNIT OF SUPPLEMENT | | | |

| BASIC WORD | | | FILE WORD | | |
|---|---|---|---|---|---|
| NUMBER OF SUPPLEMENT | 25 | NUMBER OF SUPPLEMENT | | | |
| QUANTITY | 26 | QUANTITY | SALES QUANTITY | SALES QUANTITY | SALES QUANTITY |
| STOCK CONTROL UNIT | 27 | STOCK CONTROL UNIT | | | |
| UNIT PRICE | 28 | UNIT PRICE | | | |
| GROSS PROFIT | 29 | GROSS PROFIT | GROSS PROFIT | GROSS PROFIT | GROSS PROFIT |
| SALES | 30 | SALES | SALES | SALES | SALES |
| DATE SLIP NO. LINE NO. DEBITS AND CREDITS DIVISION BROUGHT FORWARD TO NEXT PERIOD | 31 | DATE SLIP NO. LINE NO. DEBITS AND CREDITS BROUGHT FORWARD TO NEXT PERIOD | | | |
| EXPECTED DATE OF LENDING RETURN | 32 | | | | |
| OUR WAREHOUSE | 33 | | | | |
| WAREHOUSE TO WHICH ARTICLES ARE CONVEYED | 34 | | | | |
| WAREHOUSE NAME TO WHICH ARTICLES ARE CONVEYED | 35 | | | | |
| OUR WAREHOUSE DIVISION | 36 | | | | |

DATA PROCESSING APPARATUS

This application is a Continuation, of application Ser. No. 07/360,241, filed Jun. 1, 1989, now abandoned.

BACKGROUND OF THE INVENTION

1. Field of the Invention

The present invention relates to a data processing apparatus for performing input, update, and output processing operation for a file.

2. Description of Related Art

A conventional data processing apparatus including a computer stores files in a disk unit, for example, and updates the files in accordance with input record data. Companies in various industrial sectors are introducing computers, and the contents of files and input records are different depending on the industry sectors. Even in a same industrial sector, a line of business generally differs depending on the specific nature of the particular business. Accordingly, the contents of files, and records to be input or to be output from the files, are variously different.

In order to deal with the situation described above, in a conventional data processing apparatus, a system is designed to correspond to various particular input records, files, and output records. Accordingly, programs are designed and prepared individually to deal with the particular input records, files, and output records. In each case, the program is designed in a program language. More specifically, in response to data input from an input section, a data processor performs a set of processing operations such as reading a record to be updated from a file, performing arithmetic and logical operations for the record, and rewriting the record in the file. A program must be described in a program language so as to execute the set of processing operations each time a record is input.

As described above, in a conventional data processing apparatus, various programs must be prepared dedicated for each line of business of various industrial sectors. In designing a file management system for managing files, an update program for updating a file must be designed. A structure of a record in a file and word positions in a record are fixedly allocated in a memory. Furthermore, the respective files have different record structures. For this reason, a program for updating a record in a file in accordance with an input data, must be designed to be adapted for the particular record structure. Such program design is troublesome and time consuming. In addition, each firm or company generally requires a large number of different types of files, and therefore is obliged to design, individually, a large number of programs corresponding to the respective files.

Furthermore, each firm uses a large number of types of business slips or forms, including, for example, order-acceptance slips, sales slips, purchase slips, and transfer slips of traveling-expense statement of accounts, credit slips, and the like. Throughout the following description, such slips, forms, records, etc. are referred to as "slips" for ease of designation. In general, each firm or company has its own input record formats for the above various types of slips. Accordingly, an input processing program must be individually designed in correspondence with the various types of slips of the respective users. Therefore, a great deal of labor and time is required to design the individual system satisfying the requirements of each user.

Furthermore, in each program is described to have a set of procedures of inputting, updating, and outputting of a file. Therefore, when the contents of files or input or output records are updated for a change of the line of business and the like, a large number of modifications are required for each program. Such modifications for an entire system are not easily accomplished, and in some cases, a system must be redesigned.

SUMMARY OF THE INVENTION

An object of the present invention is to provide a data processing system which can uniformly and automatically process all the data, and which can correspond to data processing operations of various industrial sectors and lines of business without requiring generating of individual user's specific programs.

The present invention includes various aspects, some of which are summarized below.

According to a first aspect of the invention, a data processing apparatus comprises input record storage means for storing input record; update designation data storage means for storing designation data for transforming an input record into an update record, the designation data comprising data for designating a record keyword, data for designating a data word, a file keyword and data for designating the contents of an update word; update record generating means, coupled to said input record storage means and to said update record designation data storage means, for extracting words serving as the record keyword and the data word from the input record stored in said input record storage means, in accordance with the designation data in said update designation data storage means, and for generating an update record comprising the extracted record keyword, the extracted data word, the file keyword, and the designated update word; update record storage means, coupled to said update record generating means, for storing the generated update record; file storage means for storing a record comprising a record keyword and data word by file and in accordance with the record keyword; update processing means, coupled to said file storage means and to said update record storage means, for reading out the generated update record from said update record storage means, and for performing a processing of a type corresponding to data of the update word in the generated update record, on the records in the file stored in said file storage means and designated by the record keyword; and wherein the generated update record includes an update word designating the type of the processing.

According to a second aspect of the invention, a data processing method comprises inputting input record; designating designation data for transforming an input record into an update record, the designation data comprising data for designating a record keyword, data for designating a data word, a file keyword and data for designating the contents of an update word; extracting words serving as the record keyword and the data word from the input record, in accordance with the designated designation data, and generating an update record comprising the extracted record keyword, the extracted data word, the file keyword, and the designated update word; storing a record comprising a record keyword and data word by file and in accordance with the record keyword; and performing a processing of a type corresponding to data of the update word in the generated update record, on the stored records designated by the record keyword.

According to a third aspect of the invention, a data processing apparatus comprises file storage means for storing records with reference to a record keyword, each of the records comprising a record keyword and a data word; output record designating means for designating a record keyword for a record to be read out from said file storage means; output record generating means, coupled to said file storage means and to said output record designating means, for reading out a record from said file storage means in accordance with the designation by said output record designating means, and for generating an output record; output record storage means, coupled to said output record generating means, for storing the generated output record; and wherein record keywords in respective records stored in said file storage means are weighted to form a code constituting the record keyword; and said output record designating means includes means for designating a number of digits of the code, the code constituting the record keyword of the respective records stored in said file storage means; and said output record generating means includes means for generating a new output record from the output record read out from said file storage means, a record keyword of the new output record being derived from the designated number of digits.

According to a fourth aspect of the invention, a data processing method comprises storing records with reference to a record keyword, each of the records comprising a record keyword and a data word, and wherein record keywords in respective said stored records are weighted to form a code constituting the record keyword; designating a record keyword for a record to be read out from said stored records; reading out a record from said stored records in accordance with said designated record keyword, and generating an output record; said step of designating includes designating a number of digits of the code, the code constituting the record keyword of the respective said stored records; and said step of generating includes generating a new output record from said read out record, a record keyword of the new output record being derived from said designated number of digits.

As described above, according to the aspects of the present invention, all the data are arranged and consolidated in such a manner that the data can be processed uniformly and automatically. The data processing system according to the aspect of the present invention operates based on data itself, unlike a conventional data processing system wherein a location in which data are stored must be specified. The data processing systems according to the aspect of the present invention is so designed that the contents of data input processing, file updating processing and data output processing are analyzed and divided into a plurality of processing steps. The respective processing steps can be executed independently in a uniform and automatic manner. More specifically, each processing step can be executed by a common program independent of a format of a slip. Further, the contents of data to be processed in each of the processing steps may comprise a data designating data itself such as a record keyword and a word No. and the like. Thus, even if the data have various different formats, the designation data can permit all the necessary processings to be executed without requiring dedicated user's specific programs.

BRIEF DESCRIPTION OF THE DRAWINGS

FIG. 1 is a view showing an overall arrangement of a data processing apparatus according to the present invention;

FIGS. 5A and 5B are views showing storage statuses of update records in update record memory 23;

FIGS. 6A and 6B are views showing storage statuses of files in file memory 24;

FIG. 10 is a view showing an example of a designation data in output record designation memory 26;

FIG. 13 is a view showing a specific example of records stored in generated record memory 21;

FIGS. 14A–14C are views showing storage statuses of records stored in file memory 24;

FIG. 15 is a view showing an example of a designation data stored in output format designation memory 28, and FIGS. 16A–16E are views for explaining the contents of the respective designation data;

FIGS. 18A–18D show print statuses of output data;

FIGS. 22 and 23 are views showing print statuses of output data; and

FIGS. 24 through 29C are views for explaining another embodiment wherein FIG. 24 is an arrangement of an overall system of the data processing apparatus according to the present invention, FIG. 25 is a view showing the designation data stored in record designation memory 33, FIG. 26 is a view showing the designation data stored in file designation memory 37, FIGS. 27A–27D show details of the designation data shown in FIG. 23, FIG. 28 is a flowchart for showing a file-updating operation, and FIGS. 29A through 29C are views showing another example of a word arrangement constituting a basic record.

DETAILED DESCRIPTION OF THE PREFERRED EMBODIMENTS

Figure 2:
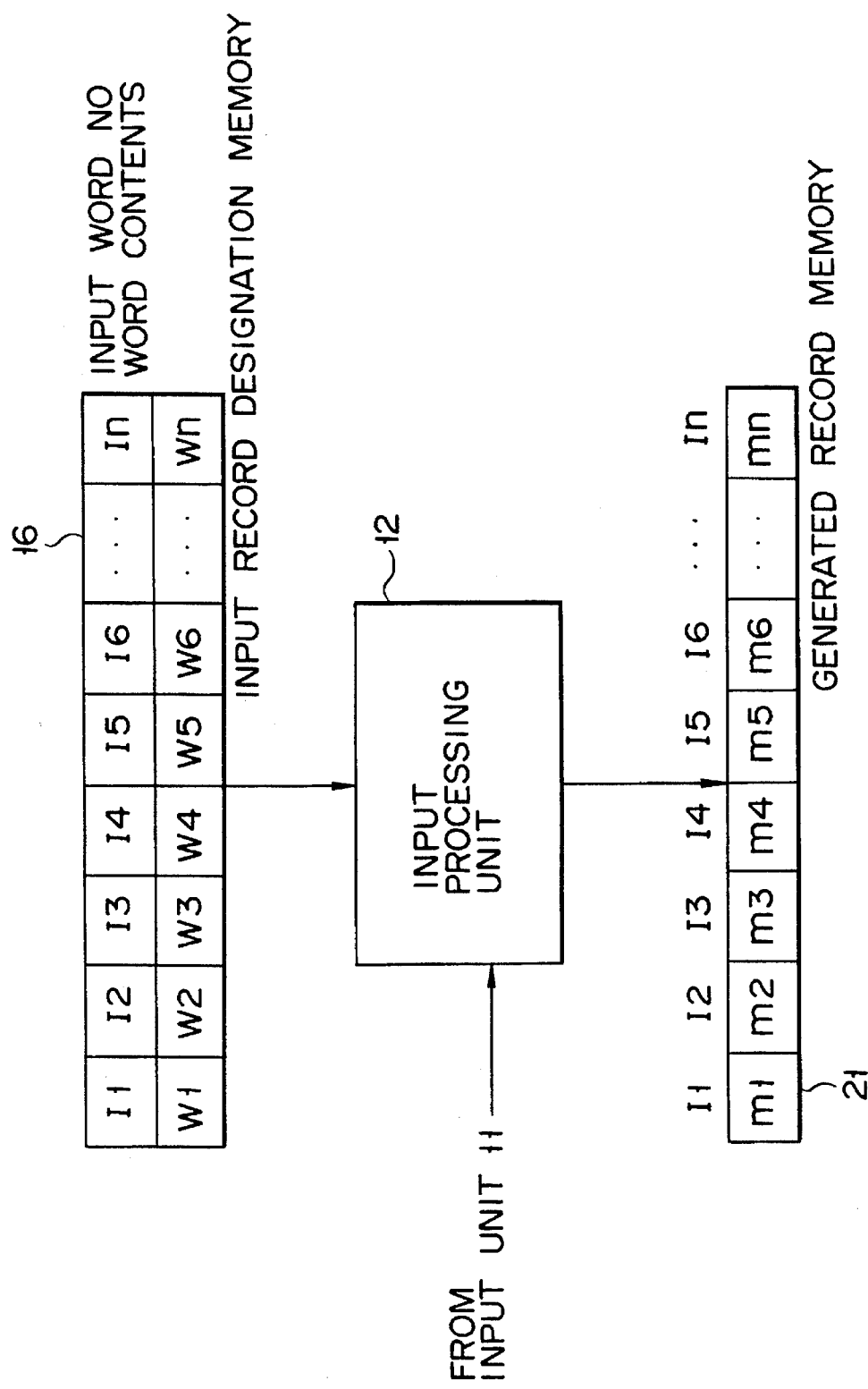
FIG. 2 is a view for explaining an operation of input processing unit 12.

An embodiment of the present invention will now be described with reference to FIGS. 1 through 20.

FIG. 1 shows an overall arrangement of a data processing apparatus according to the present invention. Input unit 11 inputs slip data and the like, and comprises setting keys for preliminarily setting various designation data, numeric keys for inputting data, and function keys and the like. Input processing unit 12, basic record generating unit 13, update record generating unit 14, and file update processing unit 15 are connected in tandem to input unit 11. Input record designation memory 16, basic record designation memory 17, update record designation memory 18, and update memory 19 are connected to input processing unit 12, basic record generating unit 13, update record generating unit 14, and file update record processing unit 15, respectively. Furthermore, generated record memory 21, basic record memory 22, update record memory 23, and file memory 24 are connected to input processing unit 12, basic record generating unit 13, update record generating unit 14, and file update processing unit 15, respectively. Predetermined data from input unit 11 are set in input record designation memory 16, basic record designation memory 17, and update record designation memory 18, respectively. The details of the respective designation data are described later. Input record designation memory 16 stores the correspondence between word Nos. and word contents of a record to be generated and the word contents. The word contents represents an "input word", an "index word", a "calculation word" and the like. Basic record designation memory 17 stores the correspondence between the respective word Nos. of a basic record to be described later and the respective word Nos. of a record stored in generated record memory 21. Update record designation memory 18 stores data representing the correspondence between the respective words of an update record comprising a single or a plurality of record keywords and data words, and the respective words of a basic record. Furthermore, memory 18 stores a file keyword designating a file to be updated and data designating the contents of the update.

Input processing unit 12 processes the data input from input unit 11 in accordance with the word contents stored in input record designation memory 16, writes a record corresponding to the set word No. in generated record memory 21, and starts basic record generating unit 13 after one record has been written in memory 21. Basic record generating unit 13 transforms the generated record written in generated record memory 21 into a basic record in accordance with the contents stored in basic record designation memory 17, and writes the transformed record in basic record memory 22. Further, basic record generating unit 13 starts update record generating unit 14 after completing the writing, in basic record memory 22, of basic records corresponding to a single slip which amounts to a single or a plurality of records. Update record generating unit 14 generates an update record from a basic record in accordance with the contents set in update record designation memory 18, and writes the update record in update record memory 23. The update record to be written in update record memory 23 comprises a file keyword, a single,or a plurality of record keywords, contents of update, and data words.

File update processing unit 15 is activated in response to an update-record-generating completion instruction from update record generating unit 14, or an update designation instruction from input device 11 when a batch processing is performed. Unit 15 updates the records within a corresponding file stored in file memory 24, using update memory 19 and in accordance with the file keyword and the record keywords in the update record. Update memory 19 comprises a random access memory (RAM), for example, and has areas of A, B, and C used as a work memory, respectively.

A group of records each comprising a single or a plurality of record keywords and data words are stored by file and in the order of the keyword, in file memory 24. The respective records stored in file memory 24 are read out by output record generating unit 25. Output record designation memory 26 is connected to output record generating unit 25. Output record designation memory 26 prestores designation data for generating the output record, for example a file keyword, retrieval condition, generated word, word contents, and the like, from input unit 11. Output record generating unit 25 is activated in response to an output designation instruction from input unit 11, generates a record in accordance with the contents set in output record designation memory 26, and writes the record in generated record memory 21. The record stored in generated record memory 21 is read out by output processing unit 27, output into a predetermined position with a predetermined format in accordance with the designation data preliminarily set in output form designation memory 28, and then printed or displayed on an output unit such as a printer or a display unit.

An operation of the above-described embodiment will now be described. The respective word data in an input record based on a slip and the like are input from input unit 11, and are then supplied to input processing unit 12. Upon receiving the data, input processing unit 12 refers to the designation data stored in input record designation memory 16 as shown in FIG. 2, processes the input respective word data in the order of the word No., and in accordance with the word contents "W1, W2, ..., Wn (input, index, calculation and the like)" corresponding to word No. "I1, I2, ..., In", and sequentially writes the processed results in generated record memory 21 as the word data "m1, m2, ..., mn". When the word contents is an "input word", unit 12 sets the input word data in a word position corresponding to the word No., in generated record memory 21. When the word content is an "index word", unit 12 refers to an incorporated index memory (not shown), transforms the input word data, e.g., a code data into a character data, and sets the character data in a position corresponding to the word No. of record memory 21. When the word contents is a "calculation word", unit 12 executes a calculation formula of the words and stores the calculation result in the corresponding word position in generated record memory 21. The calculation formula is defined by using the word Nos. For example, when the word contents "W3" is defined by "I1×I2", unit 12 reads the word data "m1" and "m2" represented by word No. "I1" and "I2" from generated record memory 21 and multiplies them. Word data "m3" representing the multiplied value is stored in a position of input word No. "I3" in generated record memory 21.

As described above, input processing unit 12 performs processing operations corresponding to the respective word contents stored in input record designation memory 16, and upon completion of storing all the data in one record into generated record memory 12, it activates basic record generating unit 13.

Figure 3:
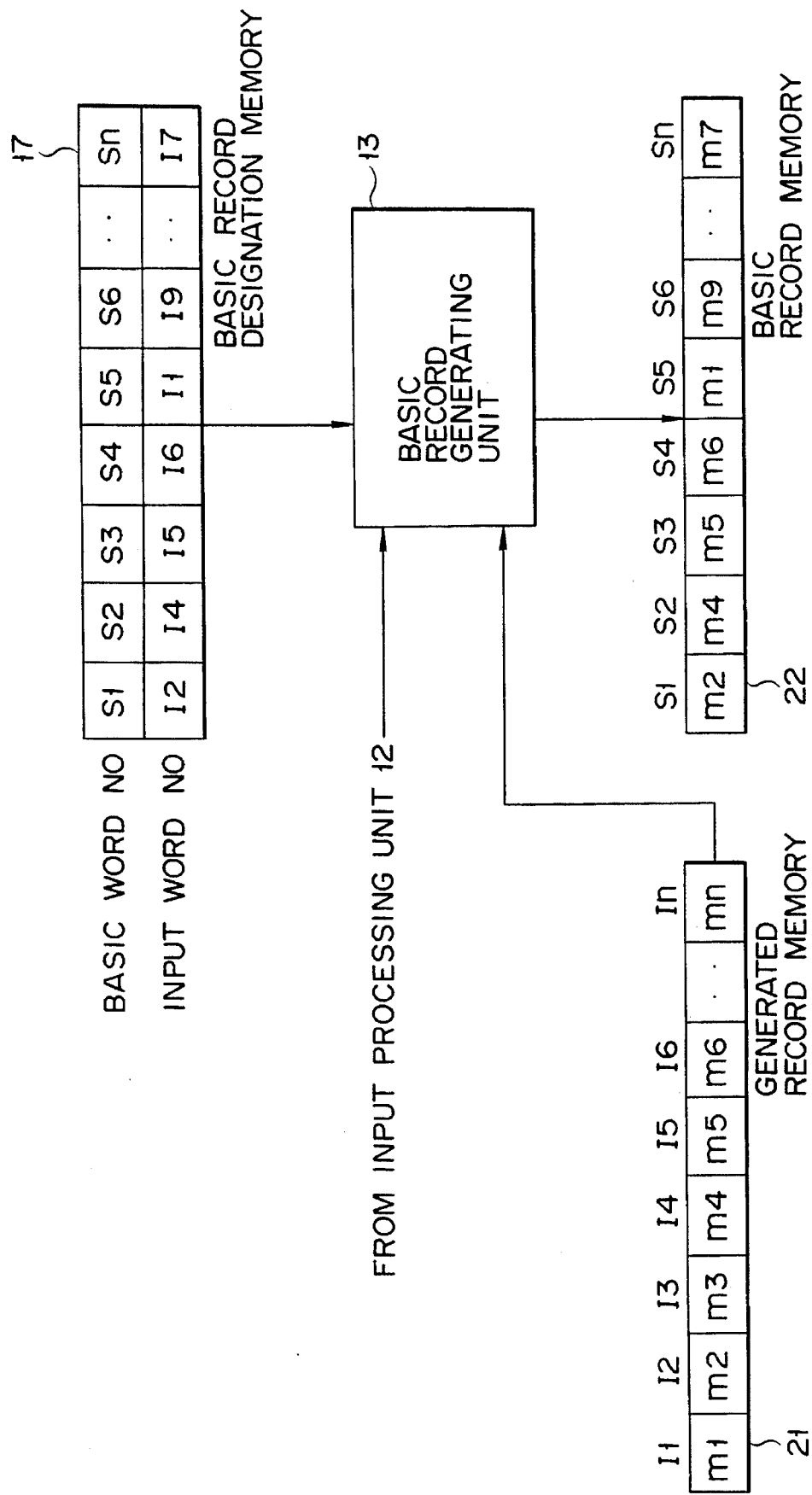
FIG. 3 is a view for explaining an operation of basic record generating unit 13.

Basic records generating unit 13 is activated in response to an instruction from input processing unit 12, and generates a basic record based on a record stored in generated record memory 12 in accordance with the designation data stored in basic record designation memory 17. More specifically, basic record designation memory 17 shown in FIG. 3 stores designation data representing a correspondence between respective word Nos. "I1, I2, ..., In" in generated record memory 21 and respective word Nos. "S1, S2, ..., Sn" in basic record memory 22. Basics record generating unit 13 arranges the respective word data "m1, m2, ..., mn" in a record stored in generated record memory 21 in the order designated by the designation data stored in basic record designation memory 17 and then stores them in memory 17. Alternatively, unit 13 generates a specific word defined by the type of the input record, and stores the word in basic record memory 22. For example, as shown in FIG. 3, when word Nos. "I2, I4, I5, . . . , I7" in the generated record are set to be correspond to the word Nos. "S1, S2, S3, . . . , Sn" in the basic record, basic record generating unit 13 arranges the word data in generated record memory 21 in the order of "m2, m4, m5, . . . , m7", and then stores the word data in basic record memory 22 as a basic record. As described above, basic record generating unit 13 generates the basic records for a single slip each comprising a single or a plurality of basic records, and then writes the generated records in basic record memory 22. When an input indication data indicating a completion of inputting data for a single slip is input to basic record generating unit 13 through input processing unit 12, unit 13 activates update record generating unit 14.

Figure 4:
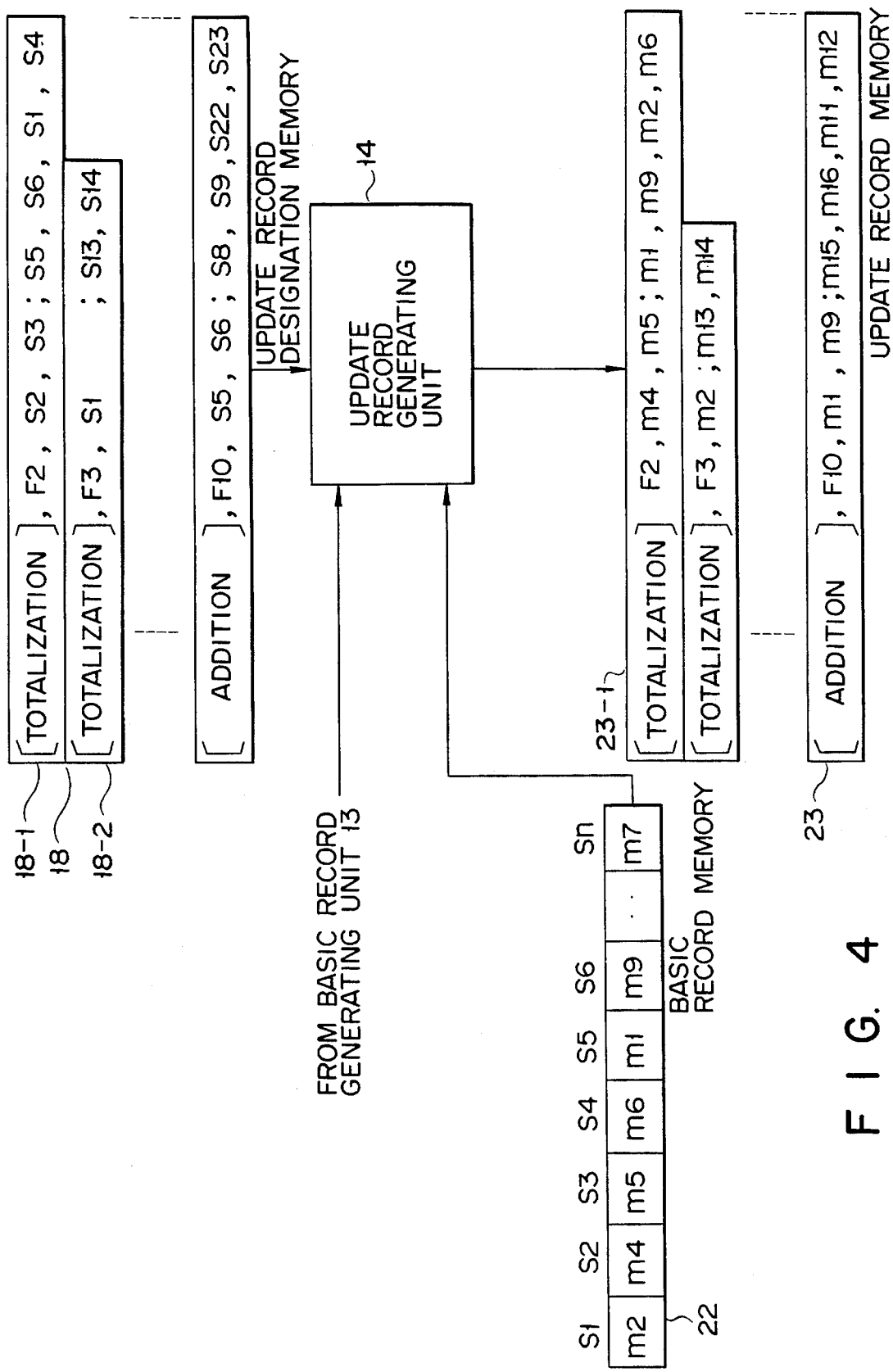
FIG. 4 is a view for explaining an operation of update record generating unit 14.

Update record generating unit 14 updates the basic records stored in basic record memory 22 to generate update records in accordance with the designation data from update record designation memory 18, and then writes the updated records in update record memory 23. Update record designation memory 18 preliminarily stores, as shown in FIG. 4, data designating word No. of the basic record indicating a single or a plurality of record keywords and data words, update contents, and a file name to be updated. For example, designation data 18-1 designates "total", "F2", "S2, S3", and "S5, S6, S1, S4" as the update contents, the file keyword, the record keyword, and the data word, respectively. In this case, two record keywords are designated. Furthermore, designation data 18-2 designates "total", "F3", "S1", and "S13, S14" as the update contents, file keyword, record keyword, and data word, respectively. In this case, a single record keyword is designated. The update contents in the designation data designates any one of "addition", "deletion", "total", "correction", and "addition and total". Update record generating unit 14 generates the update record from the basic record stored in basic record memory 22 in accordance with the designation data. For example, unit 14 generates update record 23-1 having "total", "F2", "m4, m5", and "m1, m9, m2, m6" as the update contents, file keyword, record keyword, and data word, respectively. Other update records are similarly generated and stored in update record memory 23. The respective words of the update record stored in update record memory 23 are divided by delimiters "," and ";", and the respective update records are divided by delimiter "(". Each update record has a variable length. In each of the update records, record delimiter "(" is followed by words indicating the "update contents", "file keyword", and "record keyword". The record keyword comprises a single or a plurality of words which are individually divided by delimiter ",". Further, delimiter ";" is followed by data words.

FIG. 5A shows an update record having the "update contents" of one word. However, the update record may have the "update contents" as shown in FIG. 5B. More specifically, as shown in FIG. 5B, when the update content is total, a sign "+" or "−" indicating "addition" or "subtraction" is appended to the words to be totaled. If the update contents is "correction", a sign "*" is appended to the data word to be corrected. If it is the "deletion", the update record may have only the record keyword without appending the data words. If it is "addition", the record keyword and the data word to be added are added in the update record. In other words, if the update record comprises only a file keyword and the record keyword(s), the update contents means "deletion". Upon a file update processing, if file update processing unit 15 finds, in file memory 24, no record having a record keyword identical to the record keyword of the update record, the update processing means "addition". On the contrary, if unit 15 finds the record in file memory 24, it checks the data word whether "+", "−" or "*" is appended thereto. If "+" or "−" is appended to the data word, unit 15 determines that the update contents means "total". If "*" is appended to the data word, it determines that the update contents means "correction". Thus, unit 15 can perform the corresponding processing operation on a file to be updated.

File memory 24 stores, as shown in FIG. 6A, a number of records each comprising the record keywords and the data words in the order of the file keywords and the records in a file are arranged in the order of the record keywords. In FIG. 6A, " ", "(", ",", and ";" represent a file delimiter, a record delimiter, a word delimiter, and a delimiter indicating a record keyword and a data word. Further, "F1", "F2", . . . represent file keywords, and "m" indicates a variable data comprising bytes corresponding to the length of an effective data. Each word and record in file memory 24 has only packed transaction data. In each file, the number of record keywords in the respective records are identical. Files F1 and F2 have three and two record keywords, respectively. In the example of FIG. 6A, delimiter ";" is used between a record keyword and a data word. However, a predetermined number of words from the beginning of a record may be defined as a keyword. In this case, file update processing unit 15 may be designed to recognize a predetermined number of words from the beginning of the record as the keyword. Further, each file may have a different number of record keywords by preliminarily storing in a memory the number of record keywords for every file. FIG. 6B shows another record format stored in file memory 24. A single or a plurality of words divided by a first delimiter "." from the beginning of a record represent a record keyword. For example, in file F1, "m, m, m." are the record keywords. The record keywords "m, m, m." are further divided individually by another delimiter ",". The words following the first delimiter "." represent data words. These data words are individually divided by delimiter ".". Although, a record keyword is normally displaced in the beginning of a record, it may be displaced in any position within the record unless it is preliminarily fixed.

Figure 7:
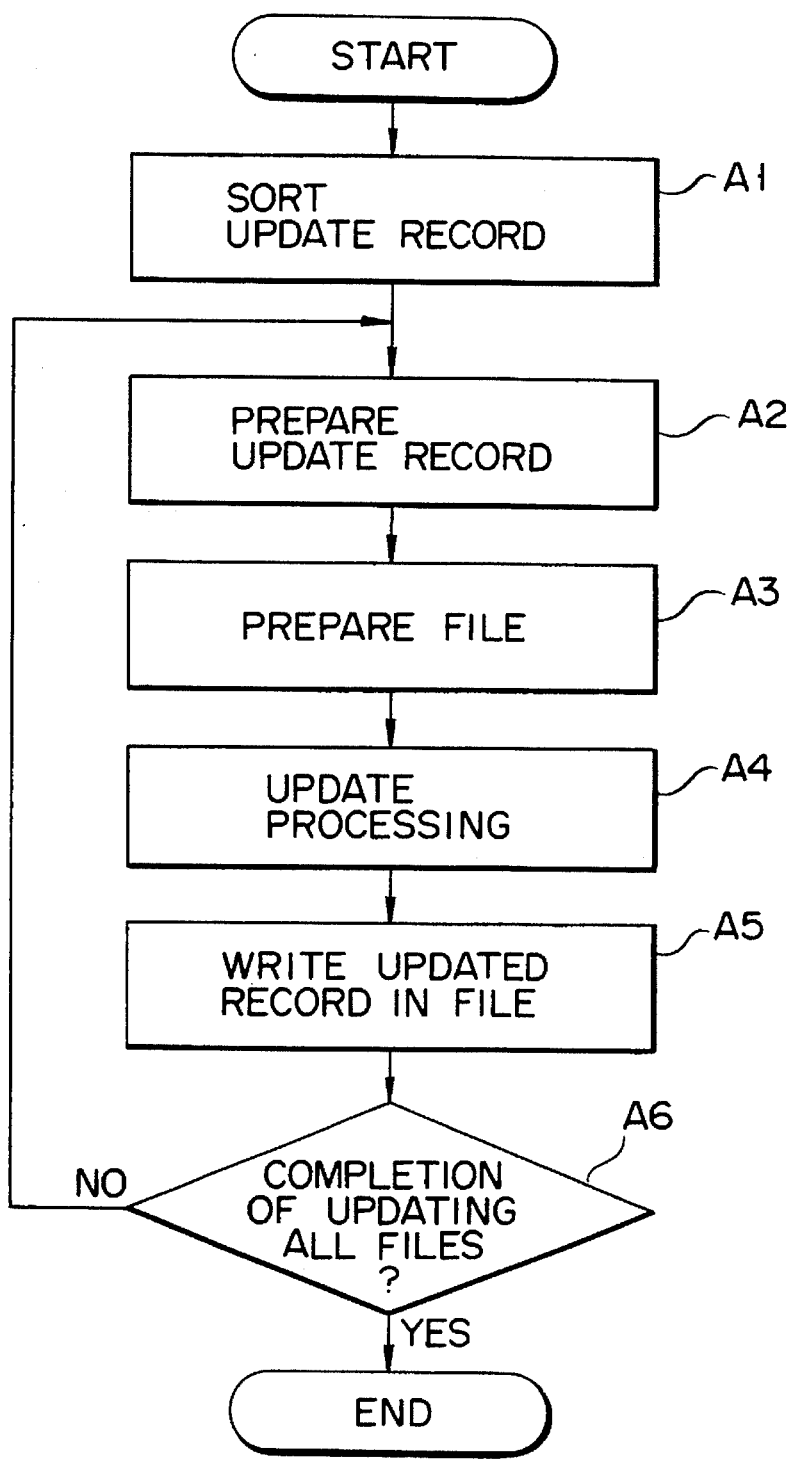
FIG. 7 is a flowchart for explaining an operation of file update processing unit 15.

File update processing unit 15 is activated in response to an instruction from update record generating unit 14 or an update designation instruction from input unit 11, and executes the file update processing shown in a flowchart of FIG. 7. More specifically, unit 15 sorts the update records in update record memory 23 in the order of the file keyword and in the order of the record keyword in the file. (step A1 in FIG. 7)

Unit 15 then reads out all the update records having an identical file keyword from memory 23, and writes them in area A of update memory 19. (step A2). Further, unit 15 reads out all file the records having the corresponding file keyword from file memory 24 and writes them in area B of update memory 19. (step A3) Unit 15 sequentially compares the record keywords of the records stored in areas A and B in update memory 19, and updates a record in area B corresponding to an update record in area A in accordance with the update contents of the update record. (step A4) The updated records or the records in area B which have not been updated are written in area C in update memory 19 in the order of the keywords, for example with the keywords in ascending or descending numerical order, as desired. When the update processing for the records stored in areas A and B is completed, the updated records stored in area C of update memory 19 are written in a new area in file memory 24. (step A5) Then, it is determined whether the update processing of the update records corresponding to all the file keywords stored in update record memory 23 has been completed. (step A6) If the processing has not been completed, unit 15 returns to step A2 and performs the update processing for the update records corresponding to the remaining file keywords. When the update processing in steps A2 through A6 is repetitively performed for all the update records in memory 23, the file update processing is completed.

The update processing in step A4 wherein the update record is updated in accordance with the update contents will now be described.

If the update contents indicates the "addition", records to be added having record keywords and data words in the update record are inserted, in the order of the record keywords, in the records which are read out from file memory 24 and stored in area B of update memory 19. In case of "deletion", records in area B which are coincident with the record keyword in the update record are deleted. In this case, by designating only the upper word of the record keyword, or the upper digit of the record keyword, all the records in area B which are coincident with the designation can also be deleted. When the update contents is "total", among the data words of the respective records in area B which are coincide with the record keyword, the data designated by the data word of the update record is added to the corresponding word. If the data word in the update record is negative, the data is subtracted from the corresponding word. When the update contents is "correction", among the words of the respective records in area B which coincide with the record keyword in the update record, the words corresponding to the data words in the update record are corrected to become the word data designated by the data word in the update record. When the update contents is "addition and total", if the records which coincide with the record keyword in the update record exist in area B, a similar operation as "total" is performed, and if no such records exist, a similar operation such as "addition" is performed.

Figures 8, 9:
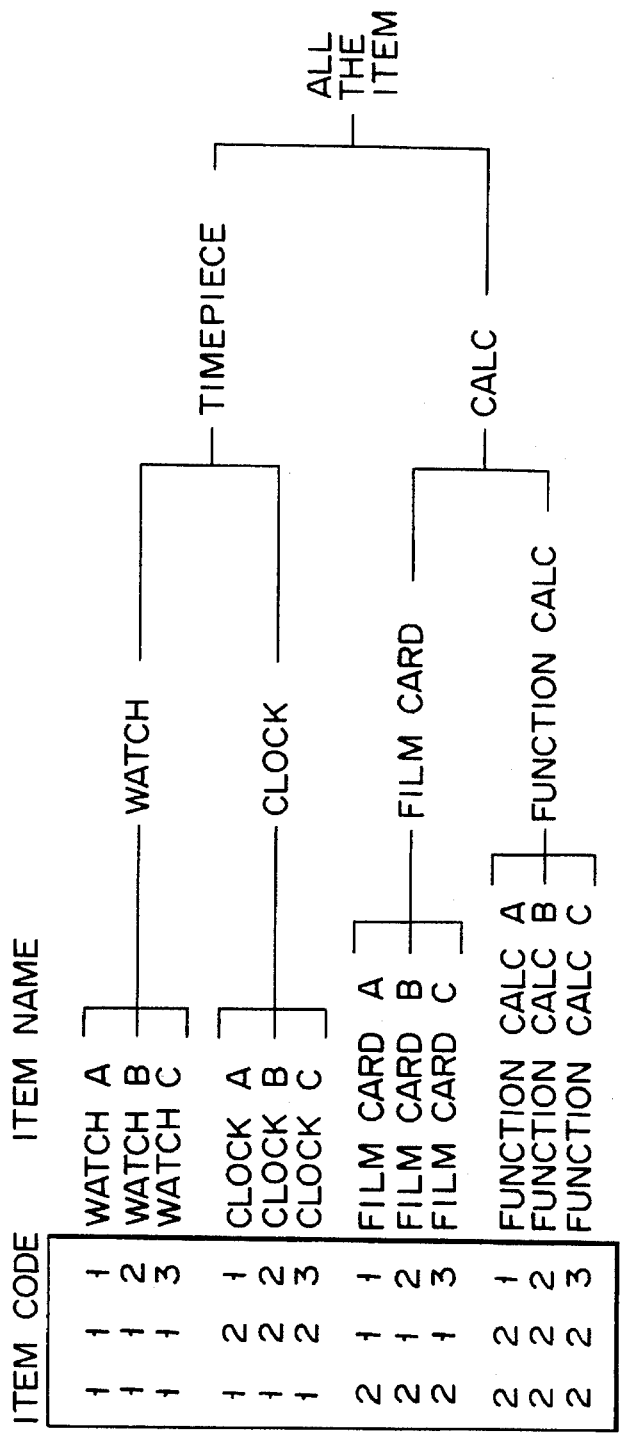
FIG. 8 is a view showing a specific example of records in file memory 24.
FIG. 9 is a view explaining a code system of a commodity code.

As described above, the records input by input unit 11 are updated for each of the corresponding files in file memory 24. An example of a file stored in file memory 24 is shown in FIG. 8. In FIG. 8, the start word in each record designated by word No. "01" is a record keyword, and more specifically an item code is stored as the record keyword. Words designated by word No. "11", "12", . . . in each of the records are data words in which "a unit price", "amount" and the like are stored. Each word comprises a variable length data. Each word is divided by a word delimiter code ",", and a record delimiter code "(" is inserted in the beginning of the record. The records are arranged in ascending order of the record keywords and are packed and stored in a memory without providing any space such as a leading zero. The item code used as a record keyword in each record has a code system shown in FIG. 9. For example, item codes "111", "112", . . . . denotes "watch A", "watch B", and the like. The item codes shown in FIG. 9 also represents "large classification" and "medium classification". The uppermost and the upper two digits in each item code represent the large classification and the medium classification, respectively. For example, "11" and "12" represent a "watch" and a "clock" respectively. Further, "1" and "2" of the uppermost digit in each item code represent a "watch" and a "pocket calculator", respectively. More specifically, the codes used as the record keyword of the item codes and the like are weighted corresponding to the large classification, medium classification and the like in the order from the upper to lower digits in each code. When a record has a plurality of record keywords, they are weighted sequentially from the first to the last digit. A code used as the record keyword comprises a variable length data. When an item code for a new item name "watch Ba" is set between item codes "112" and "113", the item code for the new item may be set as "1121". Therefore, the addition of a new record can be facilitated. The record keywords can be weighted from the last to the first digit, or in any other desired order.

As described above, file memory 24 stores records corresponding to an item code, but stores no records regarding the large and medium classification. Further, each record has no word data corresponding to "a total amount". These records and word data are arbitrarily generated by output record generating unit 25 as described below.

Figure 12:
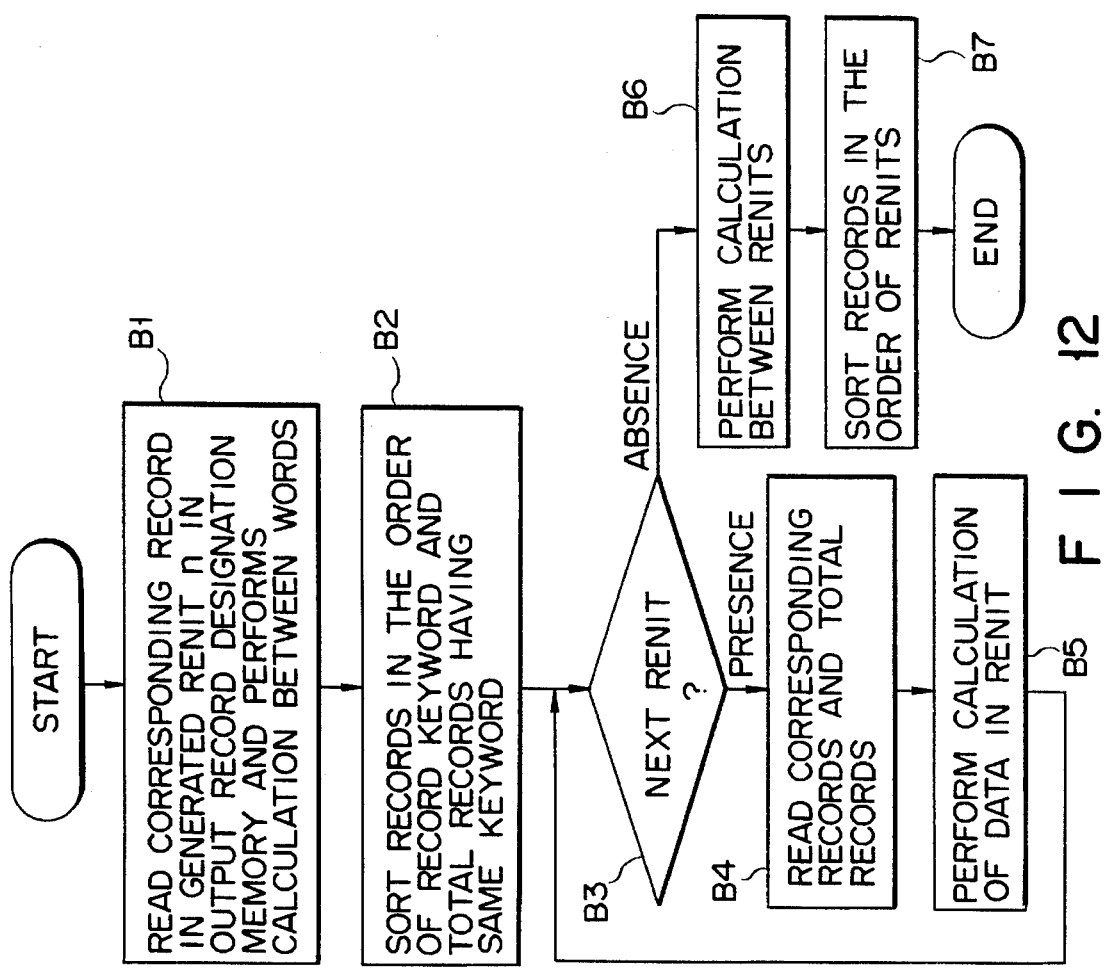
FIG. 12 is a flowchart for explaining an operation of output record generating unit 25.
Figure 11:
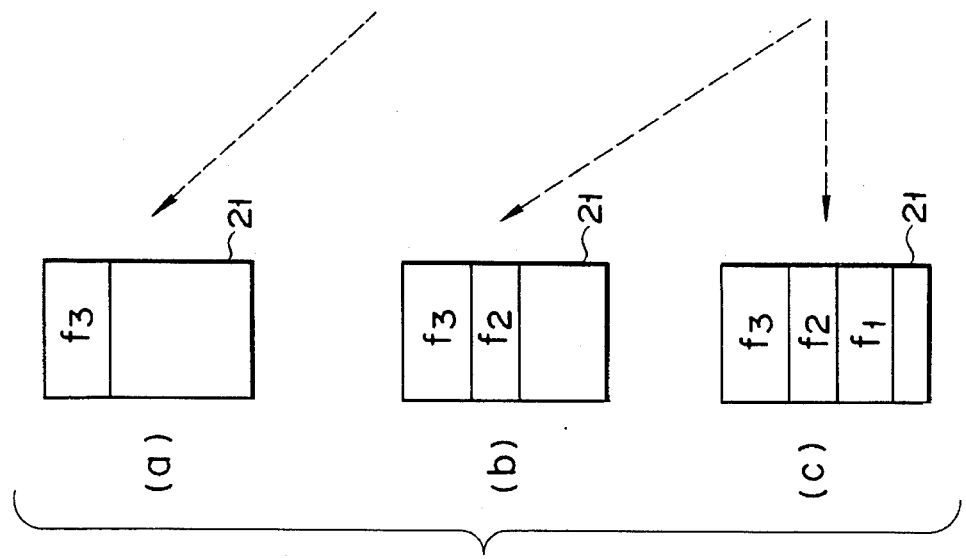
FIGS. 11(a), 11(b), and 11(c) show storage statuses of output records in generated record memory 21.

FIG. 10 shows an example of the designation data in output record designation memory 26. FIG. 12 is a flow chart showing an operation of output record generating unit 25. In accordance with the designation data in output record designation memory 26, an output record as shown in FIG. 13 is generated from a record in file memory 24 and stored in generated record memory 21. An operation of generating the output record will now be described.

Output record designation memory 26 stores a file keyword and a retrieval condition as a designation data for retrieving and reading a predetermined file and record from file memory 24. Furthermore, memory 26 stores output record generating words with its word contents. Furthermore, in order to generate the output record corresponding to the weight of the record keyword, memory 26 (see FIG. 10) stores designation data of generating renit 3 (renit means a record unit), generating renit 2, and generating renit 1. The output record generating word can designate an arbitrary number of words constituting an output record. In this example, word Nos. ".1", ".2", and ".3" of the output record generating word correspond to "a01>1", "a01>2", and "a01<3", respectively. The "a" of the word contents of "a01>1" represents a record (a source record) retrieved and read out from file memory 24, and "a01" represents a word of word No. "01" of the source record. Output records can be collected or sorted at an arbitrary classification or totalizing level by using the upper record keyword portion (i.e., upper level digits), and the output records having various levels can be collected and totaled. FIG. 10 shows an example of collecting the output records up to level three. Each sorting or collecting level is called a "renit" (an abbreviation of a record unit). Generation renit 3 designates an output record with a lowest level generated from the source record. Generation renit 2 designates output records collected at an upper level from the output records generated under the designation of generation renit 3. Generation renit 1 designates output records collected at further upper level generated from the output records generated under the designation of generation renit 2. A record keyword of an output record of generation renit 3 comprises three words designated by the word contents corresponding to generation word ".1", ".2", and ".3". A record keyword of an output record of generation renit 2 comprises two words designated by word contents ".1" and ".2". Similarly, a record keyword of an output record of generation renit 1 comprises one word designated by the word content ".1". For example, since the record keyword of generation renit 3 comprises word contents "a01>1", "a01>2", and "a01>3" corresponding to ".1", ".2", and ".3", the first word ".1" of the record keyword is set a first digit of the word data of word No. "01" of the source record. Similarly, the second word is set the second digit of the word data of word No. "01". Furthermore, the third word is set the remaining digits of the word data of word No. "01". The "b" of word contents "b.1/T" represents an output record, and "b.1" designates to read out the word data of word No. ".1" of the output record. Accordingly, word contents "b.1/T" set corresponding to generation word "11" is a designation data for reading out the word data of word No. ".1" of the output record, further reading out the corresponding data from table memory T (not shown) and sets the readout data as the word data of word No. "11" of the output record of generation renit 1. More specifically, an item name corresponding to an item code read out from word ".1" is read out from table memory T and written in an output record as the word data of word No. "11". Generation word 11 corresponding to generation renit 2 is set to have word content "b.1&b.2/T". This word content designates that respective word data of word Nos. ".1" and ".2" of the output record are combined, and a data corresponding to the combined data is read out from table memory T, and the read out data is used as the word data of word No. "11" of the output record of generation renit 2. The word No. "11" of the output record of generation renit 3 is set "a01/T" as the word content. In this case, a data corresponding to the word data of word No. "11" is read out from table memory T and the read out data is stored as the word data of word No. "11". As described above, when "1" is designated in the respective generation renits corresponding to generation words "12", "13", "14", and so on, the word data are generated in accordance with the respective word contents. Note that "C1" of the generation word is a console word which is used for temporarily storing a generated word, and for performing a calculation between renits in accordance with the temporarily stored word.

An operation of output record generating unit 25 will now be described with reference to the flowchart shown in FIGS. 11(a) through 11(c) and 12. Prior to the processing shown in the flowchart, assume that records having a designated file keyword and retrieval condition (for example, a condition of a specified word having a specified value or, more, and the like) are read out from file memory 24 and stored in generated record memory 21. In the following example, assume that all the records in the file shown in FIG. 8 are read into generated record memory 21. In step B1 of FIG. 12, output record generating unit 25 read out from output record designation memory 26 a designation data of renit n having a lowest level, e.g., of renit 3 in the example of FIG. 10, and generates the respective word data of the output record in accordance with the designation data. For example, unit 25 generates an output record "1, 1, 1, watch A, 1000, 50, 500000, ," from a source record "111, 1000, 50, . . . " in file memory 24 shown in FIG. 8. At this time, the word of word No. "15" in the output record is not generated. Similarly, unit 25 generates, in accordance with the designation data of renit 3, the output records from all the source records, and then writes them in generated record memory 21. In step B2, unit 25 sorts the output records in the order of the record keyword. If unit 25 finds a plurality of output records having an identical record keyword, it totals up the respective data words in the output records to generate a single output record. Unit 25 thus generates an output record corresponding to renit 3 and stores it in generated record memory 21 as output record file f3 as shown in FIG. 11(a). In step B3, unit 25 determines the presence or absence of a designation data regarding next renit. If the presence of the designation data is determined, unit 25 generates an output record in accordance with the designation data corresponding to renit 2 in output record designation memory 26. For example, in generation word No. "13" and "14", "1" indicating "totals up" to upper-level renit is designated, unit 25 totals up the word data of word Nos. 13 and 14 of the output record of renit 3, and sets the totaled word as the word data of word Nos. "13" and "14" of the output record of renit 2. In step B5, unit 25 performs a calculation within a renit. For example, unit 25 stores word data of word No. "14" generated in renit 2 in console word "C1". Unit 25 performs processings of steps B3 through B5 in accordance with the designations of the respective renits to generate and store in generated record memory 21 output record files f2 and f1 according to the respective renits, as shown in FIGS. 11B and 11C. If absence of renit next to be designated is determined in step B3, unit 25 moves to step B6 to perform a calculation between renits. For example, unit 25 computes a ratio of a word generated in generation renit 2, e.g. console word "C1" to a word of word No. "15" of the output record of generation renit 3. This ratio may be a ratio of profit to sales. Unit 25 stores the computation result in generated record memory 21 as the corresponding word data of the respective records of generation renit 3. In step B7, unit 25 rearranges all the output records in generated record memory 21 in the order of the renits. More specifically, unit 25 rearranges all the output records in ascending order based on the record keywords within word ".1", ".2", and ".3" of the output record. The result of the rearrangement is shown in FIG. 12. In this example, output records are rearranged in ascending order of the renits. However, the output records may be rearranged in descending order or in a designated order of the renits.

In the example described above, the output records of the upper level renits are generated in accordance with the designation data in output record designation memory 26. However, the records corresponding to the upper-level renits may be preliminarily stored in file memory 24. In this case, when the generation of the update record is designated in update record designation memory 18, a record keyword corresponding to the upper-level renit may be designated in memory 18. In accordance with the designated record keyword, update record generating unit 14 may generate the update record corresponding to the upper-level renit. In this case, records corresponding to the upper-level renit are generated in file memory 24 as shown in FIG. 14A due to the update processing of file update processing unit 15 to be described later. In FIG. 14A, each word of word Nos. "01", "02", and "03" is a record keyword. The respective records are arranged and stored in the order of the record keywords. FIGS. 14B and 14C show another storage formats of the records shown in FIG. 14A. In FIG. 14B, a data designating a level of a renit is stored in word No. "01", and a keyword in the renit is stored in word No. "02". FIG. 14C shows an example wherein a plurality of types of record delimiters are provided corresponding to the respective renit levels. FIGS. 13 and 14A–14C are shown to include a space data in order to clarify the correspondence between a word No. and a word data. However, no space data is included when the word No. and the data word are actually stored in a memory. More specifically, word data having variable length data are divided by the delimiters and packed in a memory.

Each record generated in generated record memory 21 as described above is necessarily transformed into a basic record due to the processing of basic record generating unit 13 so that files in file memory 24 can be reupdated by update record generating unit 14 and file update processing unit 15. Further, each record generated in generated record memory 21 is read out by output processing unit 27, and displayed or printed out by output unit 29 together with field-framing lines designating a form and the like, in accordance with the designation data in output from designation memory 28. An output processing of the form will now be described.

FIG. 15 shows an example of a designation data in output form designation memory 28. Word Nos. and field-framing lines to be output corresponding to the output records of the respective renits are designated. The beginning of the field-framing line is designated by X and Y coordinates corresponding to a screen of one page to be displayed or printed. The length of the line in a horizontal or vertical direction is designated by a length in X direction (in the right direction) and by a length in Y direction (in the left direction) from the beginning of the line, respectively. A line type is designated corresponding to each of top, bottom, left, and right edges. Line types of "0", "1", "2", "3", "4", "5", ... denote a thick line, a medium thick line, a thin line, a dotted line, an alternate long and short dash line, ... , respectively. For example, line type "1010" designates that the top edge is represented by the thick line; the bottom edge is not represented; the left edge is represented by a thick line; and the right edge is not represented, respectively.

FIG. 15 shows an example of the designation data. As shown in FIG. 15, a reference value Y2 of the respective output record is set in Y coordinate corresponding to "S" of column "renit". Reference value Y2 designates an output position of a first line in a page. In this case, each output record corresponds to each line in the page. A field-framing line form is set in portion "M" of column renit. FIG. 16A shows a field-framing line form of one line in a title portion wherein the top and left edges are output with a thin line in a position determined by the beginning point (X4, Y1) and length (ι4, m) corresponding to an output of word data of word No. "1", the top, left, and right edges are output with a thin line in a position determined by the beginning point (X5, Y1) and length (ι5, m), and these field-framing lines of word data of word Nos. "1" and "2" are combined. FIG. 16B shows a field-framing line form of one line of the output record of renit 1 wherein the top and left edges are output in a thick line in a position determined by the beginning (X1, Ym) and length (ι1, m) corresponding to the output of the word data of word No. "11" of the output record, the top and left edges are output in thick and thin lines, respectively in a position determined by the beginning (X4, Ym) and length (ι4, m) corresponding to the output of the word data of word No. "14", the top and right edges are output in a thick line and the left edges are output in a thin line, in a position determined by the beginning (X5, Ym) and length (ι5, m) corresponding to the output of the word data of word No. "13", and the those field-framing lines are combined. Note that Yn in Y coordinate represents a value which is successively updated by an amount of length m in Y direction based on reference value Y2 of the field-framing line form of one line. For example, when data are printed on fifth line, Yn is represented as Yn=Y2+5×m. Similarly, the field-framing line forms as shown in FIGS. 16C through 16D are output in accordance with the designation data of the respective renits. The field-framing line form of FIG. 16E which is set corresponding to "R" in column renit represents a completion form which is output after no output records exist or immediately before changing to a new page. The field-framing line form of FIG. 16E is used to output a delimitation of the forms within a page. A word data output with the field-framing line is read out from an output record in generated record memory 21 corresponding to the designated word No. in output form designation memory 28. The read out word data is arranged in a form determined by the output position of the field-framing line form of word unit which are set corresponding to the respective words. A word type designates a print form of a word data to be printed in the field-framing line form of the word unit. For example, it designates whether word data are printed right or left justified with respect to the field-framing line form of word unit, or to print each character of word data with proportional justification within the field-framing line form. The word type further designates a size of a character, and the the like. The description of the contents of the word type is omitted in FIG. 15.

An operation of output processing unit 27 will now be described with reference to a flowchart in FIG. 17. In step C1, output processing unit 27 prints, as shown in FIG. 18A, the field-framing line form of title M preliminarily designated in output form designation memory 28, and word data designated by word Nos. "1" and "2", e.g., characters such as "amount", "quantity". Note that the word data of the title is preliminarily set. In step C2, unit 27 reads out the first output record from generated record memory 21, and in steps C3, reads out, from output form designation memory 28, the designation data of the renit corresponding to the renit of the output record, generates an output record of word data designated by the respective word No. of the designation data, together with field-framing lines corresponding to the respective word Nos., and then outputs the generated the output record of word data to output unit 29. FIG. 18B shows a print state of the output record. As shown in FIG. 18B, word data of word Nos. "11", "14", and "13" in the first record in generated record memory 21 in FIG. 13 are printed together with the field-framing lines. Steps C2 and C3 are repeated until all the output records in generated record memory 21 are output. As a result, print outputs as shown in FIGS. 18C and 18D are obtained. In step C4, when unit 27 detects that no other output records exist, it reads out from output form designation memory 28 the field-framing lines of the completion form which has been preliminarily designated in memory 28, and prints field-framing lines. In this case, a thick line having a length corresponding to a horizontal field-framing line and line type of renit 1 is printed. In the designation of the print position of the field-framing line in output form memory 28, Y coordinates of the respective beginning points can be obtained only by designating as a reference value the output position Y2 of the first record. To obtain the Y coordinates of the respective beginning points, thereafter, unit 27 successively updates, in step C3 the reference value by an amount of length m in Y direction of a line. When unit 27 outputs the field-framing line in a new page, it resets the Y coordinate data to the reference value Y2, and updates the Y coordinate data each time one-line printing is completed. Similarly, the designation of the print position of the data can be performed only be designating the output position of the first output record as a reference value.

In the above example, the outputs of the respective word data and the field-framing lines surrounding the four edges of the respective word data has been described. However, the outputs of a record data for one line and the field-framing lines surrounding the four edges of the record data can also be designated in a lump, i.e., in a record unit. More specifically, the output position of the record data and the output position of the field-framing lines surrounding four edges of the record data are set in output form memory 28. Output processing unit 27 outputs the record data and the field-framing line data in positions designated by the designation data in memory 28. The output position of the respective data in Y direction is automatically updated by an amount of length of one line in Y direction based on the output position of the first record in a page every time one line of data are printed. When vertical field-framing lines delimiting the respective words in a record for one line are necessarily output, the output position and the line types of the respective field-framing lines are designated. Further, by differentiating the output positions and the line types of the field-framing lines for every renits of the record data, the printed form is easy to see since the respective data are arranged in units of renit. In order to designate this, the output positions or the types of the field-framing lines of the records for every renit can be set in output form designation memory 28.

Figure 17:
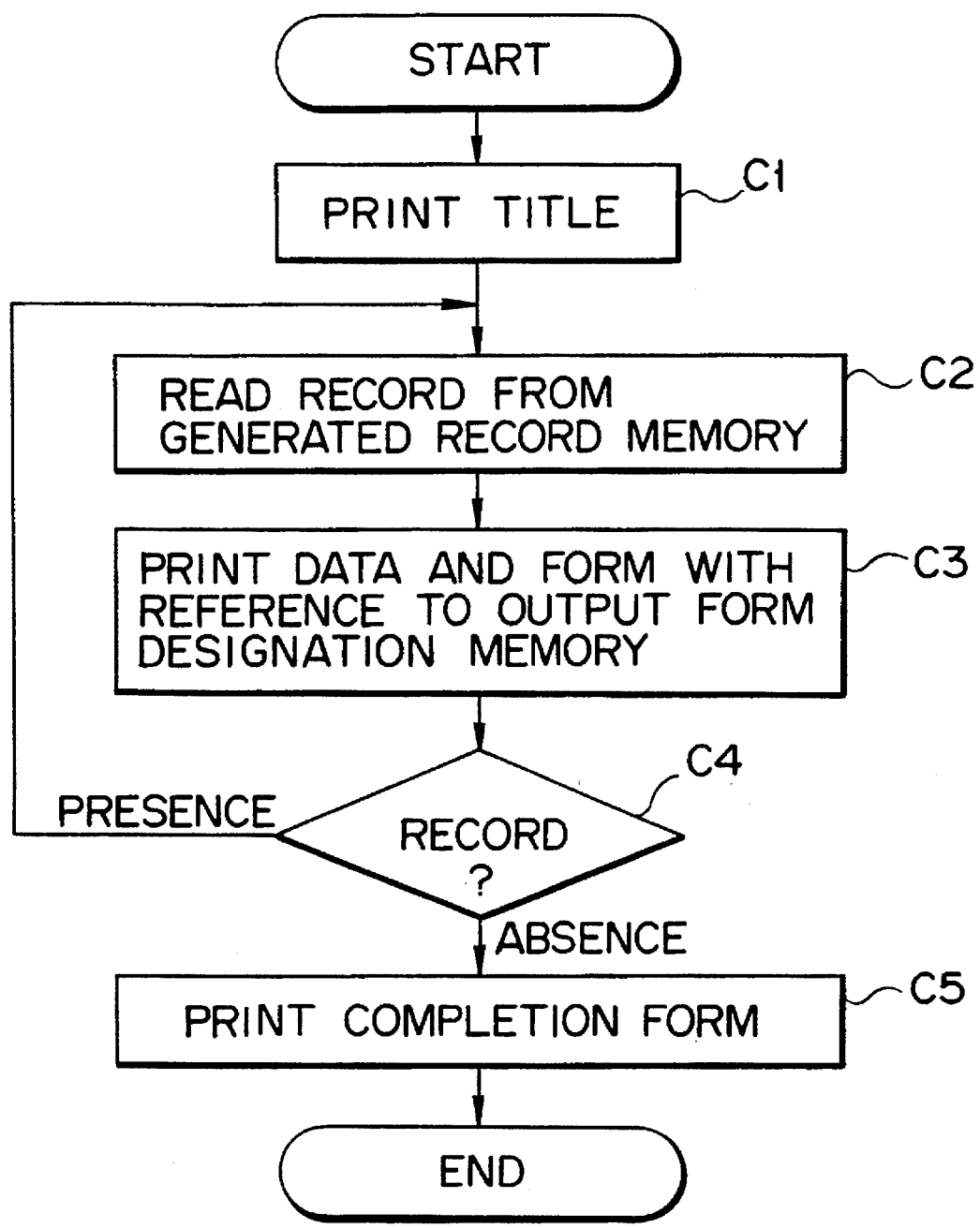
FIG. 17 is a flowchart showing an operation of output processing unit 27.
Figures 18A, 18B, 18C, 18D:
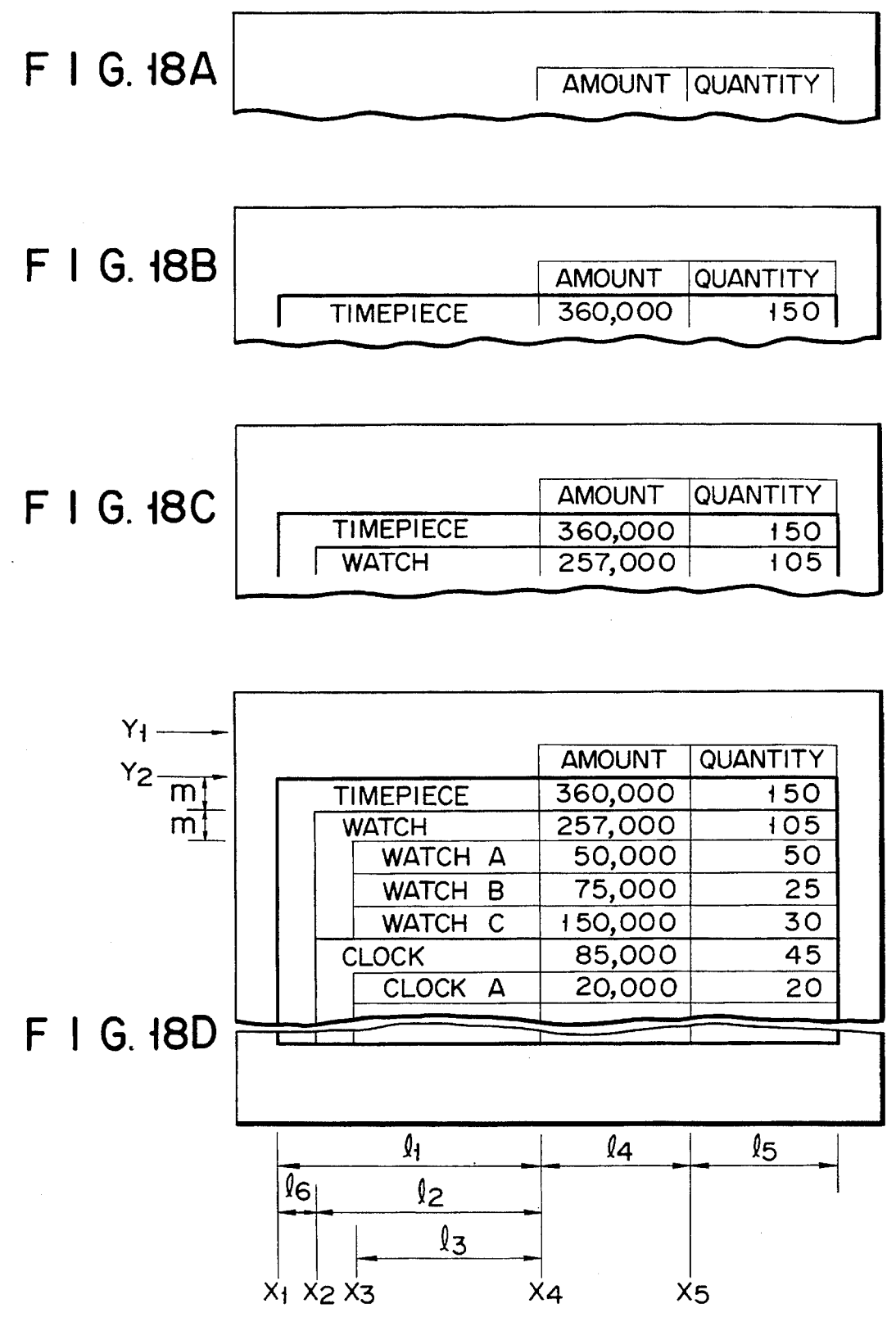
Figures 19, 20:
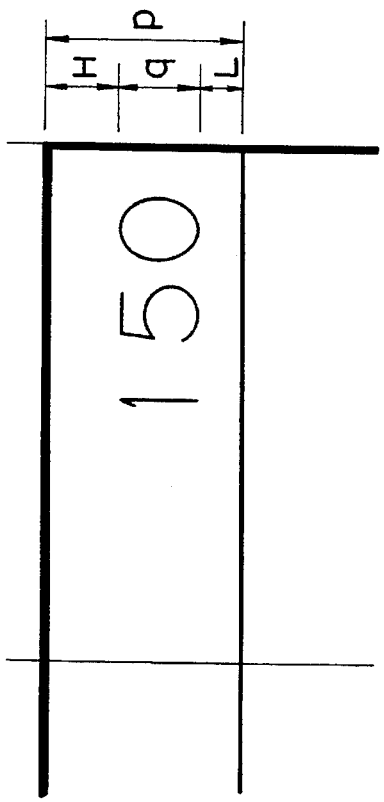
FIG. 19 shows a partially enlarged print status.
FIG. 20 is a view showing another example of the designation data stored in output format designation memory 28.

In step C3 of FIG. 17, unit 25 prints data and the field-framing lines. In this case, unit 27 prints word data corresponding to the field-framing lines of a word unit in a position in the neighborhood of the bottom field-framing line. FIG. 16 shows a partially enlarged view of printed result shown in FIGS. 18A through 18D. In FIG. 19, gap H between word data and the top field-framing line and gap L between the word data and bottom field-framing line has a relation of H:L=2:1. Although this ratio is most preferable for printing data, a relation of H>L will be satisfactory. In order, to print data in accordance with the above relation, unit 27 computes, in step C3, $H=(p-q)\times 2/3$, $L=(p-q)/3$ where p represents a length of field-framing line for one line in Y direction, and q represents a length of a character pattern of a word data in the longitudinal direction. The data p and q are set in a destination data in output form designation memory 28. Thus, unit 27 outputs data in accordance with the computed H and L.

In the print example shown in FIG. 18D, an operation of printing record data of a single page has been described. An operation of printing a plurality of pages due to increased record data will now be described.

FIG. 20 shows a designation data in output form designation memory 28 when printing a plurality of pages. In place of completion form "R" shown in FIG. 15, "R1", "R2", and "R3" are provided. The remaining designation data are identical with those shown in FIG. 15, and therefore are omitted in FIG. 20. "R1" through "R3" are completion forms corresponding to renits 1 through 3, respectively.

Figure 21:
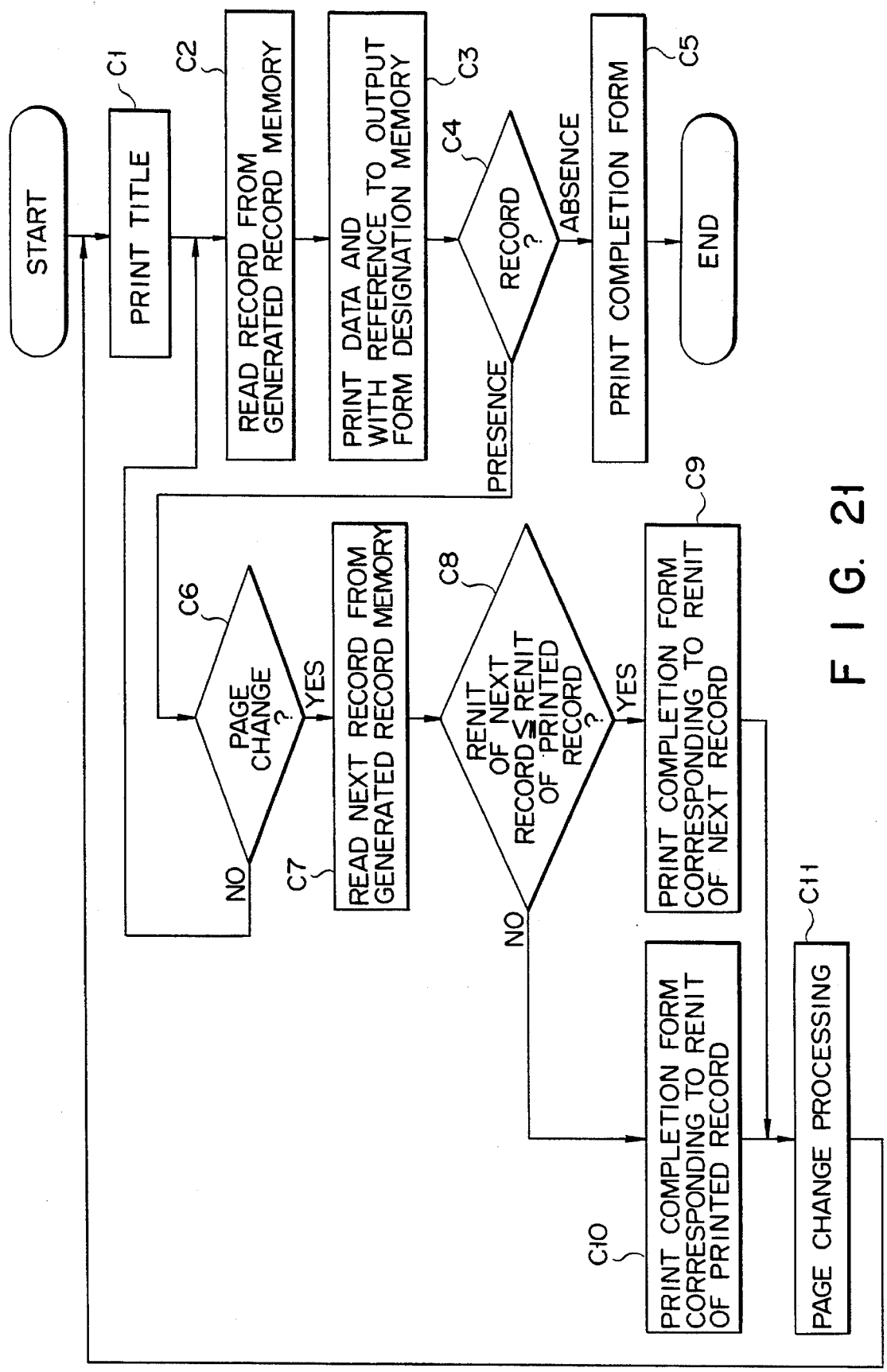
FIG. 21 is a flowchart showing another operation of output processing unit 27.

FIG. 21 is a flow chart for explaining a processing operation of output processing unit 27. This processing operation comprises the flowchart shown in FIG. 15 and an operation of printing a plurality of pages. Steps C1 through C5 in FIG. 21 are identical to steps C1 through C5 in FIG. 17, except that in step C3 in FIG. 21, a type of renit of the record data to be printed is preliminarily stored in output processing unit 27. In step C5, output unit 27 prints a completion form corresponding to "R1" in output form designation memory 28. Output processing unit 27 determines whether a record data to be printed next exist. If it exists, unit 27 moves to step C6 and determines whether data can be printed in a predetermined print area of a sheet. More specifically, unit 27 determines whether a page change is required. If no page change is determined, unit 27 returns to step C2. If a page change is determined, unit 27 executes step C7. More specifically, unit 27 reads the next record data from generated record memory 21 in step C7. In step C8, unit 27 compares the renit of the record data which has been printed in step C3 with the renit of the record data to be printed next which has been read out in step C7. If the renit of the record data which has been printed is larger than the renit of the record data to be printed next, unit 27 executes step C9. On the other hand, if the renit of the printed record data is smaller or equal to than the renit of the record data to be printed next, unit 27 executes step C10. In step C9, unit 27 reads out from output form designation memory 28 in FIG. 17 and prints the completion form corresponding to the renit of the next record data. In step C10, unit 27 prints the completion form corresponding to the renit of the record data which has been printed in step C3. More specifically, if the renit of the next record data is smaller than the renit of the previous printed record data, i.e., if the record data to be printed in the first line of the succeeding page is a record data designating an upper total level, unit 27 prints the completion form of the same renit as that of this record data. As a result, it can be clearly shown that the record data of the lower total level which has been printed in the bottom line of the page are completed within this page. In step C11, unit 27 performs a processing operation of changing a page such as resetting Y coordinate data to a reference value Y2, and then returns to step C1. In a processing of step C2 immediately after changing a page, the record data for the first line of the page have already been read out in step C7, and the record data are not read out again.

FIGS. 22 and 23 show printed examples wherein FIG. 22 shows a print example of a first page, and FIG. 23 shows a print example of a second page. A record data in the bottom line in page 1 is a record data of renit 3, and a record data in the top line in the second page is a record data of renit 2. As shown in this example, the print format of the completion format clearly shows that the three lines from the bottom of the first page are the record data of renit 3, and the print of the record data is completed within the first page. A printed material spanned over a plurality of pages can easily be recognized depending on lengths 7, 8, and 9 of the completion form to be printed on the bottom line in the first page shown in FIG. 22. More specifically, it can easily be recognized whether the record data having a same collection level are printed over a next page, and the type of the renit of the record data for the top line of the next page.

In the examples described above, record data are printed for every other line. When the record data are displayed on a CRT and the like, or printed on a page printer which prints data in a page unit, the record data are written in a page memory of one page for every other line. In this case, the changing of the length of the completion form is useful.

Further, in the above embodiment a single slip is output for one page. When a plurality of slips are parallelly output in a page, the changing of the length of the completion forms is also applied to outputting the field-framing line form for the record data in the bottom line of the slip and the record data, in the top position of the succeeding slip.

Another embodiment of the present invention will now be described with reference to FIGS. 24 through 29C.

FIG. 24 shows a system arrangement of a data processing unit. In FIG. 24, data input from input unit 31 are supplied to record processing unit 32. Record processing unit 32 makes a correspondence between input words and basic words in accordance with a designation data in record designation memory 33, and generates a single basic record per transaction. FIG. 25 shows a designation data in record designation memory 33. As is apparent from FIG. 25, a single basic record comprises 13 basic words. These basic words are necessary for updating the respective files to be described later. These basic words are "year/month/date", "slip No.", "amount", "debtor account", "debtor client", "debtor details", "creditor account", "creditor client", "creditor details", "the person in charge", "item code", "quantity", and "unit price". These basic words are set in correspondence with the input words. The correspondence between the input words and the basic words is set in basic word table 33 shown in FIG. 25. Note that the "debtor detail" may comprise "list of articles of a debtor", "quantity of a debtor", and "unit price of a debtor", and the "creditor details" may comprise "list of articles of a creditor", "quantity of a creditor", and "unit price of a creditor". In this case, "list of articles", "quantity", and "unit price" of the 11th through 13th words can be omitted. When the designation data are set in record designation memory 33, a word comprising "list of article of a debtor", "quantity of a debtor", and "unit price of a debtor" is set for a word of "debtor details", and a word comprising "list of articles of a creditor", "quantity of a creditor", and "unit price of a creditor" is set for a word of "creditor details". More specifically, when data are input from input unit 31, a label of the input word is displayed on a display unit 34. A correspondence between the input data and the basic word data is made in accordance with a designation data in record designation memory 33, to thereby generate a basic record. The basic records generated for every transaction by record processing unit 32 are sequentially stored in basic record file 35. The basic records stored in basic record file 35 are read into update record generating unit 36 in response to an update instruction from input unit 31, and update records are generated by file in accordance with the designation data according to files which are set in file designation memory 37. FIG. 26 shows a format of the designation data set in file designation memory 37. File names, contents of update, and correspondence between a file word and a basic word can be arbitrarily set. Input unit 31 sets data in file designation memory 37. Input unit 31 further sets designation data to be set in record designation memory 33.

FIGS. 27A through 27D show an example of the respective data for four types of files set by input unit 31. For example, FIG. 27A shows an update of a total account file among files to be described later. More specifically, FIG. 27A shows that the contents of the update is "totalization", the word arrangement of the update record (this word arrangement is same as that of the corresponding file) comprises "our account", "year/month", "debt amount", and "credit amount". Among these words, "our account" and "year/month" serve as the file keyword. Each file word corresponds to the basic word of "debtor account", "year/month", "amount", and "/". A data corresponding to a word of "debtor account" in the basic record is processed as the word data of "our account" in the total account file. A data corresponding to a word of "year/month" is processed as the data of a word of "year/month" in the total account file. Furthermore, the data of word "amount" in the basic record is processed as the data of word "debt amount" in the total account file. Thus, the update record for updating the total account file is generated from the basic record. FIGS. 27B, 27C, and 27D show designation data in file designation memory 37 for designating a general ledger file, item management file and a sales file among files 39.

As described above, update records are generated in a number of corresponding to the number of designation data set in file designation memory 37 for a single basic record. File processing unit 38 updates the corresponding file among files 39.

An operation of the above embodiment will now be described.

Before designing a system, it is determined what kind of data are stored and managed for a transaction processing. Files used for the transaction are set in files 39. The number of files to be set is not limited and may be set depending on an application. Files 39 includes an account ledger file, an item management file, dealer management file, a sales client file, an item ledger file, an account management file, and the like. Corresponding to the set of the files, designation data for updating the respective files are set in designation memory 37. Besides these settings, a designation data designating the correspondence between the input words and the basic words is set in record designation memory 33.

In order to input data in accordance with sales slips and the like, word data are sequentially input from input unit 31 in correspondence with the input word displayed on display unit 34. When data of one record are input, the respective word data are transformed into a basic record by record processing unit 32 and then stored in basic record file 35. This processing is repeated for every input of one record data. As a result, a plurality of records are stored in basic record file 35. Thereafter, a file update instruction is input for updating the respective files at a predetermined time in a day, for example. In response to the file update instruction, update record generating unit 36 and file processing unit 38 execute processings shown in a flowchart in FIG. 28.

More specifically, in step S1, a single basic record within the basic record file 35 are read out, and one of the designation data in file designation memory 37 is read out. (step S2) In accordance with the designation data, a correspondence between the basic words and the file words is obtained, so that individual update records corresponding to a record arrangement of respective files are generated. (step S3) Then, files among files 39 corresponding to file names in the designation data are opened. (step S4). In step S5, the update contents in the designation data are selected. File processing unit 38 updates (such as addition and totalization) the corresponding files using the update record, and then close the files. In step S6, it is determined whether other designation data exist in file designation memory 37. If the presence of other designation data is determined, the control returns to step S2, and then the above described steps are repetitively executed based on the basic record read out in step S1.

When the file update processing is completed in accordance with all of the predetermined designation data, the control moves to step S7. In step S7, it is determined whether the records exist in basic record file 35 which have not been read out yet. If the presence of the unread records exist, the control returns to step S1, the unread records are read out and the processings above described are repeated. As described above, the update processing for the preset files are performed in accordance with all the basic records stored in basic record file 35. Thus, the file update processing is completed.

FIGS. 29A-29C show another example of the word arrangement in a basic record. The basic record comprises 36 basic words required for generating update records for updating all the files including "account ledger file", "item management file", "dealer management file", and "sales client file", which can be considered to be required for firm's activity. FIGS. 29A-29C show an example of a designation data designating the correspondence between the basic word and files. More specifically, FIGS. 29A-29C show designation data in file designation memory 37 for inputting records in accordance with the sale slips. The respective words included in the input records are rearranged so as to be adapted to the format of the basic records comprising 36 basic words shown in FIGS. 29A-29C. Update record generating unit 36 generates four update records in accordance with the designation data in file designation memory 37 shown in FIGS. 29A-29C. In order to add an update record to a ledger account file, basic words corresponding to RK1 1, RK1 2, and RK2 1 and RK2 2, i.e., "debtor account", "debtor client", "creditor account" and "year/month/date" are used as the record keyword. Furthermore, the basic words corresponding to the words shown in FIGS. 29A–29C are used as the data words. These keywords and data words are arranged so as to be coincident with the record arrangement of the general ledger file, thereby generating the update record. In order to update the item management file, "item code" and "fiscal year/month" is used as the record keyword. Furthermore, the basic words corresponding to the words shown in FIGS. 29A–29C are used as the data words to thereby generate the update records. The data words are added and totalized to the record having the same record keywords in item management file. Similarly, dealer management file and sales client management file are updated by generating the update records whose record keywords are the basic words corresponding to RK1, RK2 1, and RK2 2.

Accordingly, by fixedly predetermining the word arrangement of the basic record, a file required for a firm can easily be created by only designating the words constituting the file. Therefore, the creation and update of a file can be facilitated.

What is claimed is:

1. A data processing apparatus, comprising:

file storage means for storing, in a plurality of files, a plurality of records, each record comprising at lest one record keyword and at least one data word, each of the files including a set of records arranged in order of respective record keywords;

update record storage means for storing a plurality of update records, each update record comprising an update file keyword designating a file, an update file keyword designating a file in which a record to be updated is included, at least one update record keyword that designates a record within said given file, update date designating a type of update of each designated record, and at least one update data word designating an update target word in each said designated record, the contents of the update file keyword, the update record keyword, the update data and the update data word being arbitrarily set; and update processing means, coupled to said file storage means and to said update record storage means, and including means for reading an update record from among the plurality of update records stored in said update record storage means, and means for performing an update of the type designated by the update data of the read out update record, on a record from among the plurality of records stored in a file from said plurality of files stored in said file storage means and designated by the file keyword and the record keyword included in the read out update record.

2. A data processing apparatus according to claim 1, wherein:

said update data of said update record storage means designates any of addition, deletion, correction, and totalization; and said update processing means includes means for performing any addition, deletion, correction, and totalization processing on the records in said given file, in accordance with said update data.

3. A data processing apparatus according to claim 1, wherein said update processing means further comprises:

sorting means for sorting the update records stored in said update record storage means, using as a sort key said update file keyword, said update record keyword, and said update data; and means for continuously updating, in the sorted order, records of respective files stored in said file storage means in accordance with each of said update file keyword, said update record keyword, and said update data of said plurality of update records.

4. A data processing apparatus according to claim 2, wherein each word of a record stored in said file storage means and in said update record storage means comprises variable-length data, divided by a delimiter.

5. A data processing apparatus according to claim 4, wherein each record stored in said file storage means and in said update record storage means, includes means for identifying the record keyword and the data word thereof.

6. A data processing apparatus, comprising:

input record storage means for storing input records;

update designation data storage means for storing designation data designating a format of an update record, said designation data comprising data designating a file keyword, data designating a word within an input record to be used as the record keyword, update data designating a type of update to be performed on a record, and data designating a word within an input record to be used as a data word;

update record generating means, coupled to said input record storage means and to said update designation data storage means, and including:

means for reading out the designation data from said update designation data storage means and for extracting a record keyword and a data word from an input record stored in said input record storage means, the record keyword and the data word being designated by the read out designation data, and means for generating an update record including the extracted record keyword, the extracted data word, the file keyword designated by the designation data and the update data designated by the designation data; and update record storage means, coupled to said update record generating means, for storing the update record generated by said update record generating means.

7. A data processing apparatus according to claim 6, wherein the update contents designates any of addition, deletion, correction, and totalization.

8. A data processing apparatus according to claim 6, wherein each word stored in said update record storage means comprises variable-length data, divided by a delimiter.

9. A data processing apparatus according to claim 8, wherein each record stored in said update record storage means includes means for identifying the record keyword and the data word thereof.

10. A data processing apparatus according to claim 6, further comprising file storage means for storing files, each file comprising a first set of records each of which comprises at least one record keyword and at least one data word, and a second set of records each having data words totalized in accordance with an upper keyword portion of the record keywords of said first set; and wherein said update record generating means generates an update record corresponding to the upper keyword portion when the upper keyword portion is designated by the designation update data of said designation data stored in said update designation data storage means.

11. A data processing apparatus, comprising:

input record storage means for storing input records;

basic record designation data storage means for storing basic record designation data designating a correspondence between respective words in a designated input record and respective words in a record constituting a file, the basic record designation data being set arbitrarily;

basic record generating means for extracting words from the designated input record, the words being designated by the basic record designation data stored in the basic record designation data storage means, and for arranging the extracted words in accordance with the correspondence between respective words in the designated input record and respective words in the record constituting a file to generate an update record for updating the file; and file update means, coupled to said basic record designation data storage means and to said basic record generating means, and including means for receiving a file-update record from said basic record generating means, and means for updating the file in accordance with the file-update record generated by said basic record generating means.

12. A data processing apparatus according to claim 11, wherein each word stored in said basic record storage means comprises variable-length data divided by a delimiter.

13. A data processing apparatus, comprising:

file storage means for storing, in a plurality of files, a plurality of records, each record comprising at least one record keywords, and at least one data words, each of the files including a set of records uniformly arranged in an order of the respective record keywords;

output record designating means for storing designation data including word designation data and keyboard designation data, the word designation data designating a correspondence between a word to be extracted from a record in the file storage means and an output word, and the keyword designation data designating an arbitrary word serving as a record keyword, the arbitrary word being extracted from the record in the file storage means; and output record generating means, coupled to said file storage means and to said output record designating means, and including:

means for reading out the designation data from said output record designating means, means for extracting a data word and a record keyword from the record in the file storage means, in accordance with the word designation data and the keyword designation data, to thereby generate an output record, means for arranging output records in an order of the record keyboard, and means for outputting the arranged output records.

14. A data processing apparatus according to claim 13, wherein:

sorting means is provided for sorting, in ascending order, in accordance with respective record keywords, respective output records generated by said output record generating means; and said output record generating means totals data words of records having the same record keywords, and generates a single output record, after completion of the sorting performed by said sorting means.

15. A data processing apparatus according to claim 13, wherein:

said output record designating means includes designating means for designating a record keyword and a data word in accordance with a keyword portion of an output record; and total record generating means is provided for generating a total record obtained by totaling the output records having coincident keyword portions, of the output records generated by said output record generating means in accordance with the designation of said designating means.

16. A data processing apparatus according to claim 13, wherein one of said output record generating means and said total record generating means includes means for inserting a record delimiter between records, and a word delimiter between words, each word having a variable length.

17. A data processing apparatus according to claim 15, further comprising arrangement means for arranging, in accordance with the record keywords of respective words, the output records and the total records generated by said output record generating means and said total record generating means, respectively.

18. A data processing apparatus according to claim 15, wherein one of said output record generating means and said total record generating means includes means for inserting a record delimiter between records, and a word delimiter between words, each word having a variable length.

19. A data processing apparatus according to claim 18, wherein each of the records generated by one of said output record generating means and said total record generating means includes means for identifying a record and a data word.

20. A data processing apparatus, comprising:

storage means for storing a plurality of output data;

designating means including:

means for designating field-framing lines which surround a display of output data, for thereby framing the output data, and means for designating a reference output position of the output data; and output means, coupled to said storage means and to said designating means, and including:

means for outputting the field-framing lines designated by said field-framing-lines designating means with the output data read out from said storage means, and for outputting the output data with the field-framing lines in the reference output position designated by the designating means, and means for updating the reference output position to a next position to thereby obtain the reference output position of the output data, each time output data is read out from said storage means.

21. A data processing apparatus according to claim 20, wherein said designating means includes means for designating the field-framing lines by designating a presence or absence of field-framing lines of four sides framing the output data.

22. A data processing apparatus according to claim 20, wherein said output means includes means for arranging and outputting the output data at a position between upper and lower field-framing lines, closer to the lower field-framing line.

23. A data processing apparatus, comprising:

storage means for storing a plurality of record data having different totaling levels according to a weighing of a record keyword;

designating means including:

means for designating, in correspondence to respective totaling levels, data representing the field-framing lines which surround a display of output data, for thereby framing record data to be output from said storage means, and means for designating output positions for the display of record data to be output;

reading means, coupled to said storage means, for sequentially reading record data out from said storage means;

determining means, coupled to said reading means, for determining a totaling level of a record data each time a record data is read out by said reading means; and output means, coupled to said determining means and to said designating means, and including means for outputting at the output positions designated by said output-position designating means, the read-put record data with the field-framing lines designated by the field-framing-lines designating means so as to frame the read-out record, the field framing lines corresponding to the totaling level determined by said determining means to thereby enable displaying of the read-out record data at the corresponding designated output positions together with said corresponding field-framing lines.

24. A data processing apparatus according to claim 23, wherein said designating means includes means for designating a line type of the field-framing lines.

* * * * *